United States Patent
Yoshimura et al.

(10) Patent No.: US 6,317,266 B1
(45) Date of Patent: Nov. 13, 2001

(54) COORDINATE INPUT APPARATUS

(75) Inventors: Yuichiro Yoshimura, Kamakura; Masahide Hasegawa, Yokohama; Kiwamu Kobayashi, Yokohama; Masaaki Kanashiki, Yokohama; Atsushi Tanaka, Yamato; Katsuyuki Kobayashi, Yokohama, all of (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/611,963

(22) Filed: Jul. 6, 2000

(30) Foreign Application Priority Data

Jul. 7, 1999 (JP) .................................................. 11-193334

(51) Int. Cl.⁷ ............................ G02B 27/10; G09G 05/08
(52) U.S. Cl. .......................................... 359/619; 345/157
(58) Field of Search ............................... 359/619; 341/5; 345/157, 158

(56) References Cited

U.S. PATENT DOCUMENTS

| 5,341,155 | 8/1994 | Elrod et al. ........................... 345/179 |
| 5,499,098 | 3/1996 | Ogawa ................................... 356/375 |
| 5,502,568 | 3/1996 | Ogawa et al. ......................... 356/375 |
| 5,515,079 * | 5/1996 | Hauck ................................... 345/157 |
| 5,570,299 | 10/1996 | Tokioka et al. ....................... 364/560 |
| 5,570,302 | 10/1996 | Kobayashi et al. ................... 364/561 |
| 5,748,183 | 5/1998 | Yoshimura et al. .................. 345/173 |
| 6,056,408 | 5/2000 | Kobayashi ............................ 353/122 |
| 6,129,552 * | 10/2000 | Deshoux et al. .................... 4345/226 |
| 6,229,601 * | 5/2001 | Hasegawa ........................... 356/141.5 |

FOREIGN PATENT DOCUMENTS

| 19625460-A1 * | 1/1998 | (DE) .............................. G02B/27/18 |
| 58-059436 | 4/1983 | (JP) . |
| 58-59436 | 4/1983 | (JP) . |
| 6-12183 | 1/1994 | (JP) . |
| 6-274266 | 9/1994 | (JP) . |
| 7-76902 | 8/1995 | (JP) . |
| 25-03182 | 3/1996 | (JP) . |
| 11-85395-A * | 3/1999 | (JP) ................................ G02F/3/033 |
| WO 91/01543 | 2/1991 | (WO) . |

* cited by examiner

*Primary Examiner*—Ricky Mack
(74) *Attorney, Agent, or Firm*—Fitzpatrick, Cella, Harper & Scinto

(57) ABSTRACT

A coordinate input apparatus has a region with optical characteristics for transmitting light from a pointing tool, thereby preventing reflection of external light in the visible light range from the input surface of a coordinate input screen.

9 Claims, 22 Drawing Sheets

FIG. 3

| SWITCH A | SWITCH B | SWITCH C | SWITCH D | LIGHT EMISSION | PEN DOWN | PEN BUTTON |
|---|---|---|---|---|---|---|
| × | × | — | — | OFF | OFF | OFF |
| ○ | × | × | × | ON | OFF | OFF |
| ○ | × | ○ | × | ON | ON | OFF |
| ○ | × | × | ○ | ON | OFF | ON |
| ○ | × | ○ | ○ | ON | ON | ON |
| ○ | ○ | — | — | ON | ON | ON |
| × | ○ | — | — | ON | ON | OFF |

INFRARED LIGHT TRANSMISSION BLACK STRIPE REGION

NO BLACK STRIPE 10-3-1 FILTER 10-3 FRONT PLATE 10-3 FRONT PLATE

NO BLACK STRIPE

COORDINATE INPUT APPARATUS

FIELD OF THE INVENTION

The present invention relates to a coordinate input apparatus which irradiates a predetermined position on a coordinate input window with light from a pointing tool to generate a light spot and generates coordinates corresponding to the light spot.

BACKGROUND OF THE INVENTION

Conventionally known coordinate input apparatuses sense a light spot on a screen using a CCD area sensor or linear sensor, process the image using barycentric coordinates or pattern matching to calculate the coordinate values, and output them, or use a position detection element (an analog device capable of obtaining an output voltage corresponding to the position of a spot) called a PSD.

For example, Japanese Patent Publication No. 7-76902 discloses an apparatus which senses a light spot formed by a visible parallel beam with a video camera to detect coordinates and simultaneously transmits/receives control signals using infrared diffused light. Japanese Patent Laid-Open No. 6-274266 discloses an apparatus for detecting coordinates using a linear CCD sensor and special optical mask.

Japanese Patent No. 2503182 discloses the arrangement of an apparatus using a PSD and an output coordinate correction method.

In recent years, there is a great demand for large screen displays because they have improved brightness and therefore can be sufficiently used in an illuminated environment. Coordinate input apparatuses are also increasingly required to avoid the influence of disturbance light for use in combination with such large screen displays. In recent years, the number of devices as radio communication means using infrared light is increasing. Since disturbance light tends to increase in both infrared light and visible light, an important characteristic of an apparatus is that the apparatus is not affected by disturbance light.

However, a coordinate input apparatus using a CCD sensor, as disclosed in Japanese Patent Publication No. 7-76902 or Japanese Patent Laid-Open No. 6-274266, can suppress disturbance light only with an optical filter.

To the contrary, a coordinate input apparatus using a PSD, as disclosed in Japanese Patent No. 2503182, can stand disturbance light in cooperation with an optical filter because the influence of disturbance light can be suppressed by frequency-modulating the light intensity and synchronously detecting the modulated wave.

For a large screen display, not only the brightness but also resolution is being improved simultaneously. For this reason, the resolving power of a coordinate input apparatus also need be improved. The coordinate input apparatus using a PSD, which can stand disturbance light, has a problem on this point. More specifically, the dynamic range of a sensor output voltage directly corresponds to the input range. For this reason, for example, to decompose an entire image into 1,000 coordinates, an S/N ratio of at least 60 dB is necessary. In addition, as disclosed in Japanese Patent No. 2503182, a linear error must be digitally corrected, so a highly accurate analog circuit and a multi-bit A/D converter and calculation circuit are required. Furthermore, since the S/N ratio of a sensor output signal depends on the light amount and sharpness of the light spot, only the above-described disturbance light suppression is insufficient, and a bright and highly accurate optical system is also required. Hence, the apparatus itself becomes very expensive and bulky.

As a method of increasing the resolving power using a CCD sensor, Japanese Patent Publication No. 7-76902 discloses a method of using a plurality of video cameras. However, this makes the apparatus bulky and expensive. When one video camera with a large number of pixels is used, the apparatus becomes much more bulky and expensive than that using a plurality of cameras. To achieve resolving power more than the number of pixels by image processing, an enormous quantity of image data must be processed at a high speed. For this reason, an apparatus for real-time operation becomes very bulky and expensive.

In Japanese Patent Laid-Open No. 6-274266, high resolving power can be obtained using a special optical mask and signal processing. The resolving power can be made high if disturbance light is small, and a satisfactory S/N ratio can be ensured. In fact, however, since a linear sensor forms a linear image and cannot separate it from disturbance light in plane, unlike an area sensor for forming a point image, the apparatus is readily affected by disturbance light and can be put into practical use in only a special environment with small disturbance light.

In combination of a coordinate input apparatus and projection-type large screen display, as a known technique of ensuring a wide viewing angle on the front surface as an input side and also a screen observation side of the screen used for the projection-type large screen display, a screen having a Fresnel lens and lenticular lens surface is used, and a diffusion material is used together with the screen. Additionally, as disclosed in Japanese Patent Laid-Open No. 58-59436, a screen arrangement for improving contrast is known in which black stripes 13-2 opposing concave portions on the rear surface of a lenticular lens 14-1 are formed on the observation side (image light output side) of the lenticular lens, as shown in FIG. 22. However, in detecting the coordinates, on the screen, of a light spot from a pointing tool such as a pen, the light input to the sensor is shielded by the black stripes, and no sufficient detection light amount can be ensured.

SUMMARY OF THE INVENTION

The present invention has been made in consideration of the above problems, and has as its object to provide a high-performance coordinate input apparatus with high resolving power, which can ensure a sufficient incident light amount to a sensor while holding a high-contrast image.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 3 is a table showing the operation modes of the pointing tool of this embodiment;

DETAILED DESCRIPTION OF THE PREFERRED EMBODIMENT

An embodiment of the present invention will be described below in detail with reference to the accompanying drawings.

First, the schematic arrangement of an optical coordinate input apparatus according to the present invention will be described with reference to FIG. 1.

Figure 1:
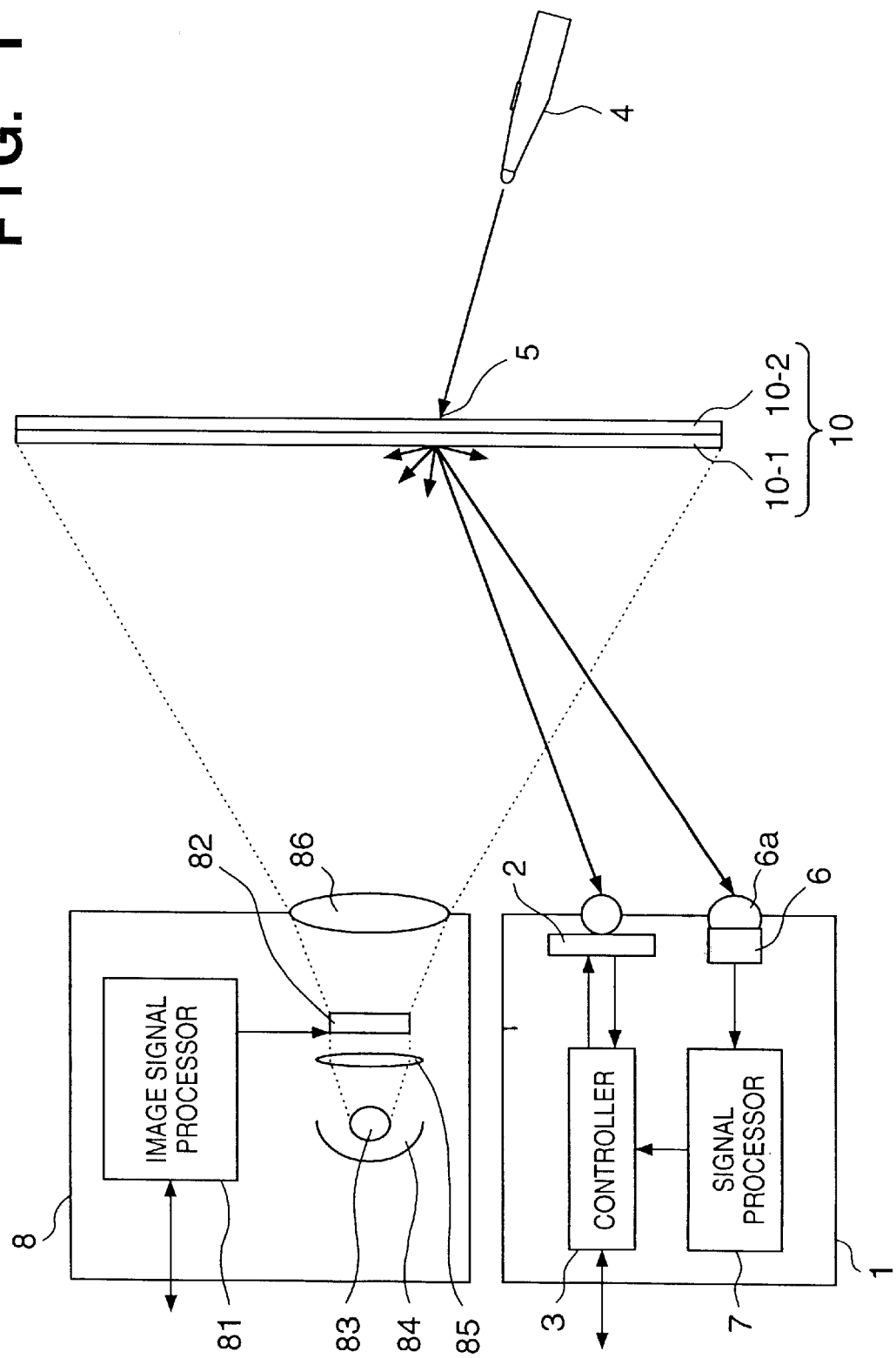
FIG. 1 is a view showing the schematic arrangement of a coordinate input apparatus according to an embodiment.

FIG. 1 is a view showing the schematic arrangement of the coordinate input apparatus of this embodiment.

This coordinate input apparatus roughly comprises a pointing tool 4 for forming a light spot 5 on a screen 10 as a coordinate input screen, and a coordinate detector 1 for detecting the positional coordinates of the light spot 5 on the screen 10. In addition to these sections, a projection-type display apparatus 8 serving as an output apparatus for displaying an image or position coordinates on the screen 10 is also shown in FIG. 1.

The coordinate detector 1 comprises a coordinate detection sensor section 2, a controller 3 for controlling the coordinate detection sensor section 2 and calculating coordinates, a light-receiving element 6, and a signal processing section 7. The coordinate position of the light spot 5 on the screen 10 and control signals corresponding to the states of switches (to be described later) of the pointing tool 4 are detected. These pieces of information are transmitted to an externally connected apparatus (not shown) by the controller 3.

The projection-type display apparatus 8 comprises an image signal processing section 81 for receiving an image signal from a display signal source as the externally connected apparatus such as a host computer (not shown), an illumination optical system controlled by the image signal processing section 81 and having a liquid crystal panel 82, lamp 83, mirror 84, and condenser lens 85, and a projecting lens 86 for projecting an image on the liquid crystal panel 82 onto the screen 10. The projection-type display apparatus 8 can display desired image information on the screen 10.

To widen the observation range of a projected image, the screen 10 is constructed by a Fresnel plate 10-1 formed from Fresnel lenses for collimating an image light beam from the projecting lens 86, and a lenticular plate 10-2 formed from lenticular lenses for horizontally diffusing light. To ensure an appropriate viewing angle range in the vertical direction, a light diffusion material is mixed into the Fresnel plate 10-1 and lenticular plate 10-2. With this diffusion function, a light beam emitted from the pointing tool 4 is diffused at the position of the light spot 5. The light diffused at the position of the light spot 5 partially becomes incident on the coordinate detector 1 independently of the position on the screen or direction of light beam. In addition, to improve contrast, black stripes are formed on the lenticular plate 10-2. The black stripes have a satisfactory transmission characteristic for the wavelength range of infrared light emitted from the pointing tool 4 such that the light diffused at the position of the light spot 5 can more efficiently become incident on the coordinate detection sensor section 2. The screen 10 will be described later in detail.

In this arrangement, when character information or line drawing information is input on the screen 10 using the pointing tool 4, and the information is displayed by the projection-type display apparatus 8, the information can be input/output as if the screen 10 and pointing tool 4 were "paper and pencil". In addition, button operation or input operation of determining icon selection can be freely performed.

<Detailed Description of Pointing Tool 4>

Figure 2:
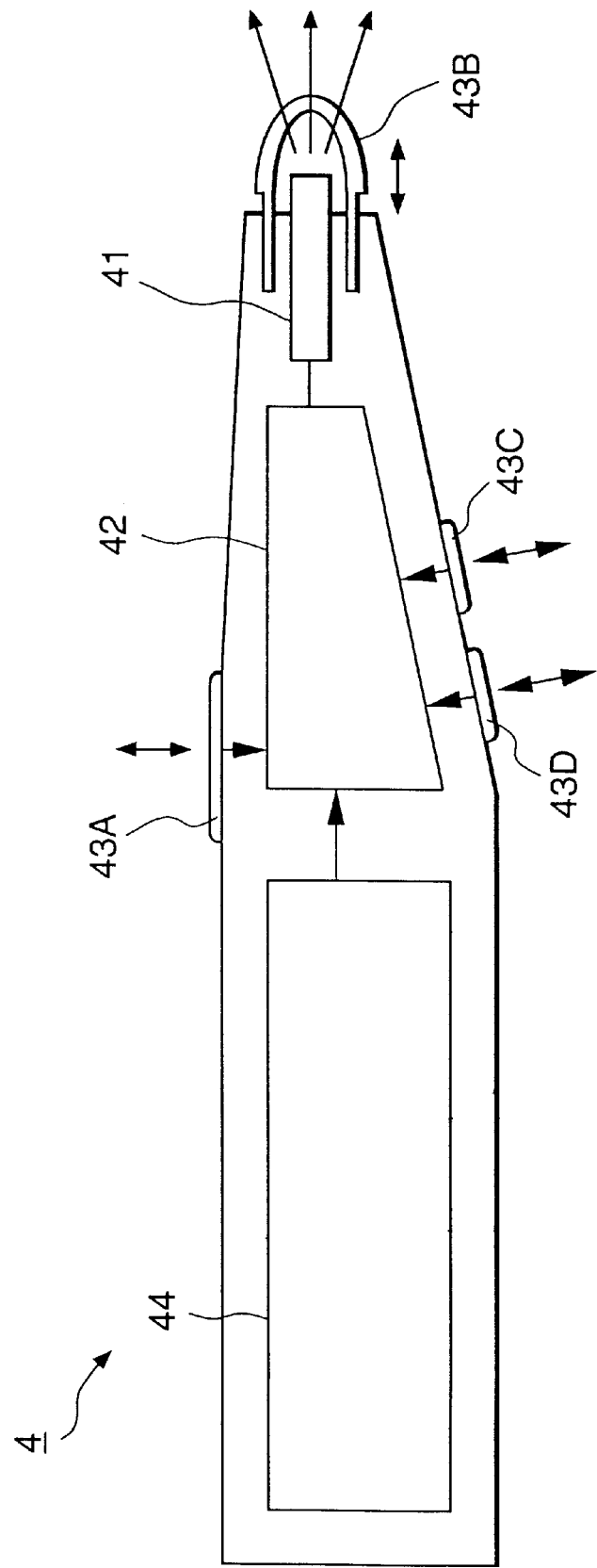
FIG. 2 is a view showing the detailed arrangement of a pointing tool of this embodiment.

FIG. 2 is a view showing the detailed arrangement of the pointing tool of this embodiment.

The pointing tool 4 incorporates a light-emitting element 41 such as a semiconductor laser for emitting a light beam or LED for emitting infrared light, a light emission control section 42 for driving and controlling light emission, operation switches 43A to 43D, a power supply section 44 such as a battery, and a cap 46 formed from a detachable transparent member which covers the light-emitting element 41. The light emission control section 42 turns on/off light emission on the basis of the states of the operation switches 43A to 43D and performs modulation in a way to be described later whereby light emission is controlled by superposing control signals.

FIG. 3 is a table showing the operation modes of the pointing tool of this embodiment.

Switches A to D correspond to the operation switches 43A to 43D shown in FIG. 2. Referring to FIG. 3, "light emission" corresponds to a light emission signal (coordinate signal), and "pen down" and "pen button" correspond to control signals.

The operator grips the pointing tool 4 and directs its distal end to the screen 10. The operation switch 43A is arranged at a position where the thumb naturally comes into contact with the switch. When the switch 43A is pressed, a light beam 45 is emitted. The light spot 5 is formed on the screen 10, and output of coordinate signals is started by predetermined processing. In this state, the pen down and pen button control signals are OFF. Hence, on the screen, only the pointing tool position is explicitly indicated for the operator by cursor motion or highlight switching of a button.

When the switch 43C or 43D arranged at a position where the index or middle finger naturally comes into contact with the switch is pressed, the pen down or pen button control signal is superposed on the light emission signal, as shown in FIG. 3. More specifically, when the switch 43C is pressed, a pen down state is set, so input of a character or line drawing can be started, or a button can be selectively determined by screen control. When the switch 43D is pressed, a pen button state is set to cope with another function of, e.g., calling a menu. This allows the operator to lightly operate the pointing tool 4 by, with one hand, quickly and accurately drawing a character or graphic or selecting a button or menu at an arbitrary position on the screen 10.

The switch 43B is provided at the distal end portion of the pointing tool 4. The switch 43B operates when the pointing tool 4 is pressed against the screen 10. When the operator grips the pointing tool 4 and presses the distal end portion of the pointing tool against the screen 10, the pen down state is set. Hence, natural pen input operation is enabled without any excessive button operation.

The switch 43A functions as a pen button. When the switch 43A is pressed without pressing the pointing tool against the screen, only the cursor can be moved. Actually, a character or graphic pattern can be input with higher operability and accuracy in direct contact with the screen than when separated from the screen. In this embodiment, independently of whether the pointing tool is separated from the screen or located immediately in front of the screen, natural and comfortable operation is enabled using the four switches. The two modes can be selectively used as needed. If the pointing tool is exclusively used for direct input (the pointing tool 4 is not used as a pointer), not a light beam but a diffusion light source suffices. Hence, an LED which is less expensive and has a longer service life than a semiconductor laser can be used.

For a case where two types of pointing tools 4 for use in proximity and remote positions are used, two or more persons simultaneously operate pointing tools, or a plurality of pointing tools 4 having different attributes such as colors or thicknesses are used, the light emission control section 42 transmits a unique ID number together with a control signal. In correspondence with the transmitted ID number, the attribute such as the thickness or color of the line to be drawn is determined by software on the externally connected apparatus side. These settings can be changed by buttons or menu on the screen 10. For this operation, an operation button may be independently prepared on the pointing tool 4 to transmit a change instruction signal. These set states may be held in the pointing tool 4 or coordinate detector 1, and not the ID number but attribute information may be transmitted to the externally connected apparatus.

Such an additional button can also be set to another function of, e.g., turning on/off the display apparatus, switching the signal source, or operating the recording apparatus. When one or both of the switches 43A and 43B have pressure detection means for detecting the writing pressure, various useful signals including the writing pressure data can be transmitted together with the control signal.

When the switch 43A or 43B of the pointing tool 4 is turned on, light emission starts. As a light emission signal, a leader section formed from a relatively long consecutive pulse sequence and a header section formed from a code (e.g., a maker ID) following the leader section are output first, and then, transmission data sequences containing a pen ID, control signal, and the like are sequentially output in accordance with an order and format defined in advance (signal LSG in FIG. 5).

In this embodiment, each data bit "1" is formed by a modulation scheme for setting an interval twice that of a "0" bit, though various data coding schemes can be used. However, as will be described later, a predetermined average light amount is preferably obtained for coordinate detection, and the clock component is preferably sufficiently large for PLL tuning. In this embodiment, since the degree of redundancy can be made relatively high without any problem from the viewpoint of the amount of data to be transmitted, 6-bit (64) data are coded by assigning them to, of codes with 10-bit length, 108 codes in which the number of 1s is equal to that of 0s, and the number of consecutive 1s or 0s is three or less. When this coding scheme is employed, the average power becomes constant, and a sufficiently large clock component is contained. For this reason, a stable sync signal can be easily generated in demodulation.

As described above, the pen down or pen button control signal contains 2-bit data, though another long data such as an ID must also be transmitted. In this embodiment, 24 bits form one block. The first two bits form a control signal, the next two bits form a content identification code (e.g., a writing pressure signal is 00, and an ID is 11), the next two bits form parities of these data, and 16-bit data and 2-bit parity follow them, thereby forming one data block. When this data is coded by the above-described scheme, a 40-bit long signal is generated. A 10-bit long sync code is added to the head of the 40-bit long signal. This sync code uses a special code formed from a pattern containing four consecutive 0s and five consecutive 1s or an inverted pattern thereof (the pattern is switched depending on whether the final bit of the previous block is 1 or 0) and therefore can be easily discriminated from a data word. For this reason, even in the middle of a data sequence, the position of the sync code can be properly identified to restore the data. Hence, one block contains a 50-bit long transmission signal for transmitting a control signal and 16-bit ID or data such as writing pressure.

In this embodiment, 7.5 kHz corresponding to ⅛ the first frequency (60 kHz) is used as the second frequency. When the above-described coding scheme is employed, the average transfer bit rate is 5 kHz (=⅔×7.5 kHz). Since one block is 50-bit long, a 24-bit data block is transmitted at 100 Hz. Hence, the effective bit rate excluding the parities is 2,000 bit/sec. As described above, although the degree of redundancy is high, a detection error can be prevented, and synchronization can be facilitated by a very simple arrangement. In addition, since a phase lock signal for sensor control (to be described later) and sync code repetitive period check are simultaneously used, follow-up is enabled even when a short dropout occurs in the signal. Inversely, actual discrimination from a case wherein quick operation such as pen up or double tap is performed can be properly done on the basis of the presence/absence of the header signal.

<Detailed Description of Coordinate Detector 1>

Figure 4:
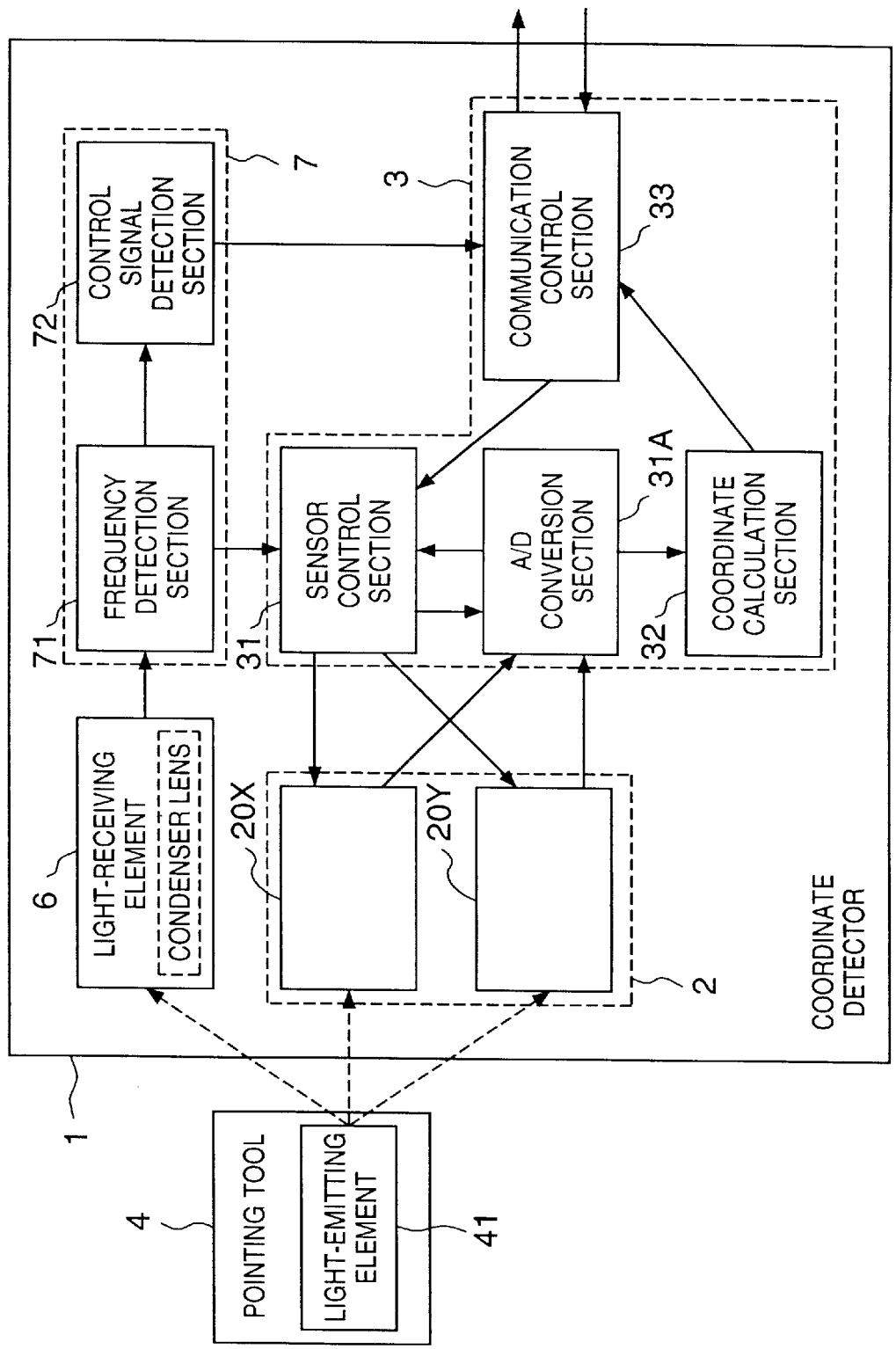
FIG. 4 is a block diagram showing the detailed arrangement of a coordinate detector of this embodiment.

FIG. 4 is a block diagram showing the detailed arrangement of the coordinate detector of this embodiment.

The coordinate detector 1 has the light-receiving element 6 for highly sensitively detecting the light amount by a condenser optical system, and two linear sensors 20X and 20Y for detecting the arrival direction of light by an imaging optical system. Each of the linear sensors 20X and 20Y receives diffused light from the light spot 5 formed on the screen 10 by the light beam from the light-emitting element 41 incorporated in the pointing tool 4.

<Description of Operation of Condenser Optical System>

The light-receiving element 6 has a condenser lens 6a as a condenser optical system to highly sensitively detect the amount of light having a predetermined wavelength within the entire range on the screen 10. The detection output is detected by a frequency detection section 71 and then demodulated into a digital signal containing data including a control signal (a signal superposed by the light emission control section 42 of the pointing tool 4) by a control signal detection section 72.

A timing chart of this control signal reconstruction operation will be described with reference to FIG. 5.

Figure 5:
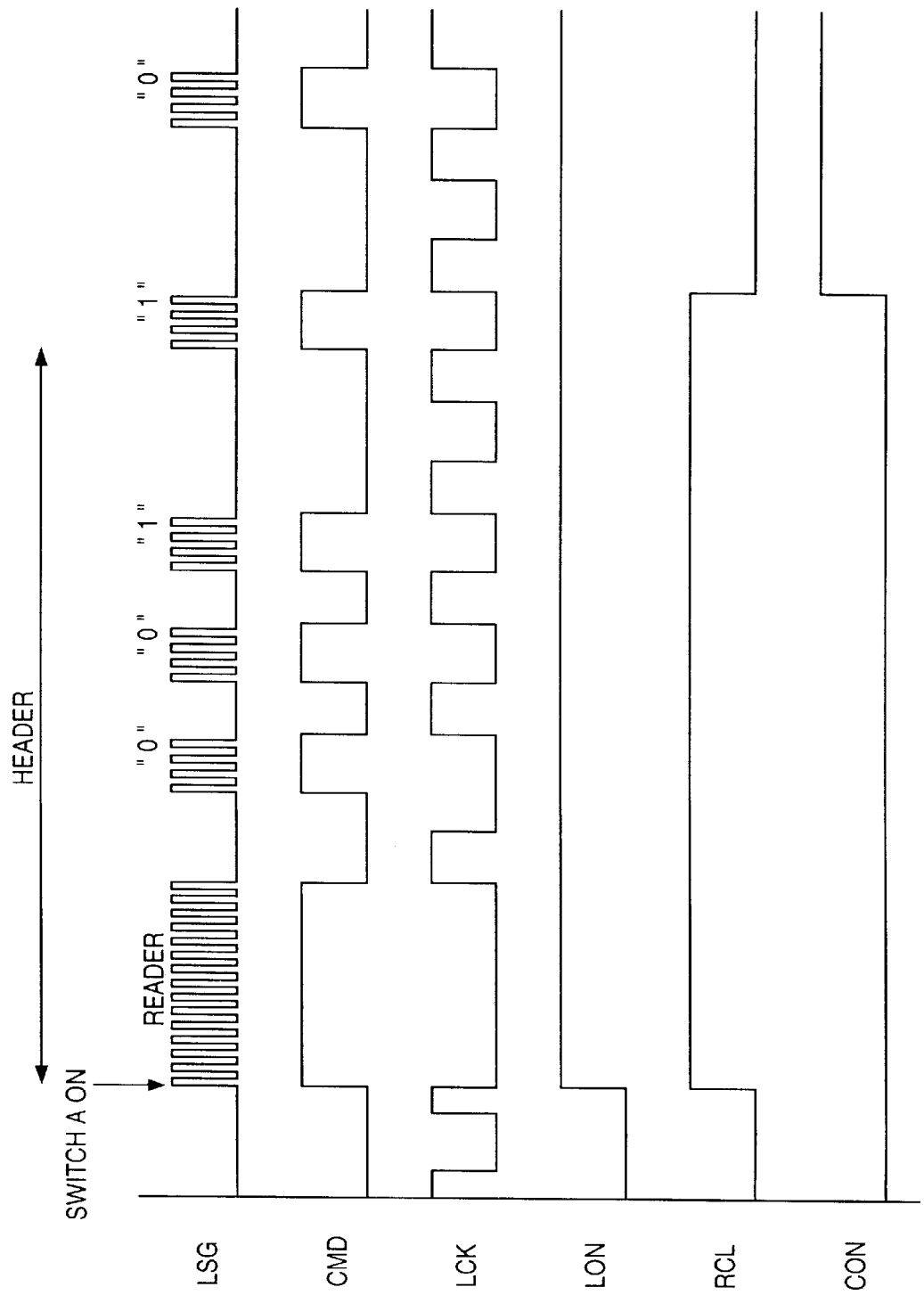
FIG. 5 is a timing chart showing control signal reconstruction operation of this embodiment.

FIG. 5 is a timing chart showing control signal reconstruction operation of this embodiment.

A data signal formed from a bit sequence as described above is detected by the light-receiving element 6 as an optical output signal LSG and detected by the frequency detection section 71. The frequency detection section 71 is designed to tune to the pulse period of the first frequency which is the highest in the optical output signal LSG and demodulates a modulated signal CMD in cooperation with an optical filter without being influenced by disturbance light. This detection method is the same as that employed by a widely used infrared remote controller as a reliable radio communication scheme.

In this embodiment, 60 kHz in a higher band than that for a general infrared remote controller is used as the first frequency, thereby preventing an operation error when the devices are simultaneously used. The first frequency can have the same band as that of the general infrared remote controller. In this case, an operation error can be prevented by identifying the devices on the basis of, e.g., IDs.

The modulated signal CMD detected by the frequency detection section 71 is decoded into digital data by the control signal detection section 72, so the above-described pen down or pen button control signal is restored. The restored control signals are sent to a communication control section 33. The period of code modulation as the second frequency contained in the modulated signal CMD is detected by a sensor control section 31. The linear sensors 20X and 20Y are controlled by this signal. More specifically, the sensor control section 31 is reset at the timing of the header section shown in FIG. 5 and then generates a signal LCK phase-locked to the trailing edge of the modulated signal CMD.

The generated signal LCK has a predetermined frequency synchronized with ON/OFF of light emission of the pointing tool 4. A signal LON representing ON/OFF of light input and a sensor reset signal RCL activated by the signal LON are generated from the modulated signal CMD. While the sensor reset signal RCL is at high level, the two linear sensors 20X and 20Y are reset. Synchronous integration operation (to be described later) starts at the trailing edge of the sensor reset signal RCL synchronized with the leading edge of the signal LCK.

On the other hand, when the control signal detection section 72 detects the header section and confirms that input of not noise or a signal from another device but a signal from the pointing tool 4 starts, a signal representing this confirmation is transmitted from the communication control section 33 to the sensor control section 31. A signal CON representing that the operation of the linear sensors 20X and 20Y is effective is set to high level, and a coordinate calculation section 32 starts operation.

Figure 6:
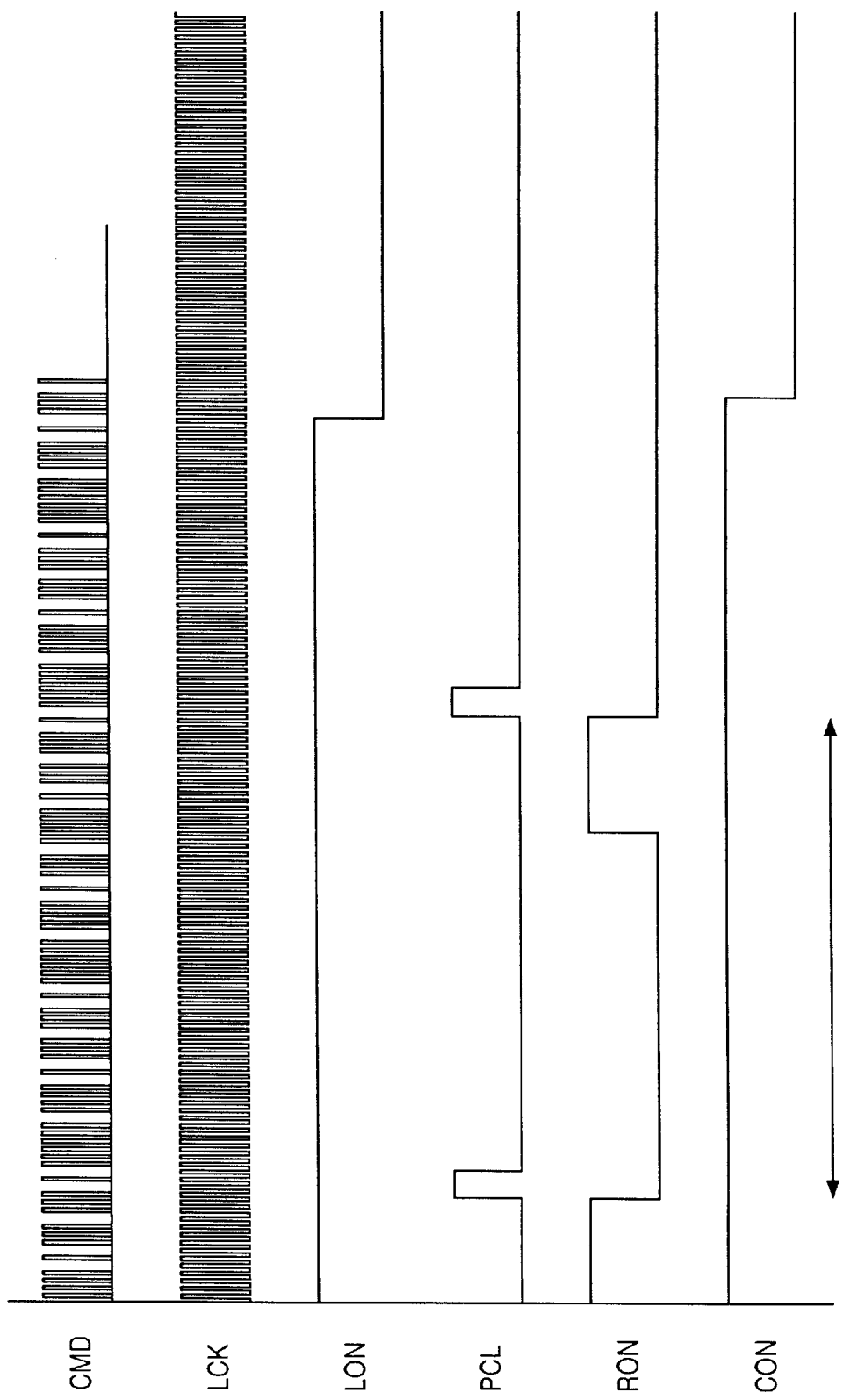
FIG. 6 is a timing chart showing signals handled in this embodiment.

FIG. 6 is a timing chart when input of the optical output signal LSG is ended, and the series of operations are ended. When the modulated signal CMD detected from the optical output signal LSG is kept at low level for a predetermined time or more, the signal LON representing ON/OFF of light input goes low, and the signal CON representing that the sensor operation is effective also goes low. As a result, coordinate output operation by the linear sensors 20X and 20Y is ended.

<Description of Operation of Imaging Optical System>

Figure 7:
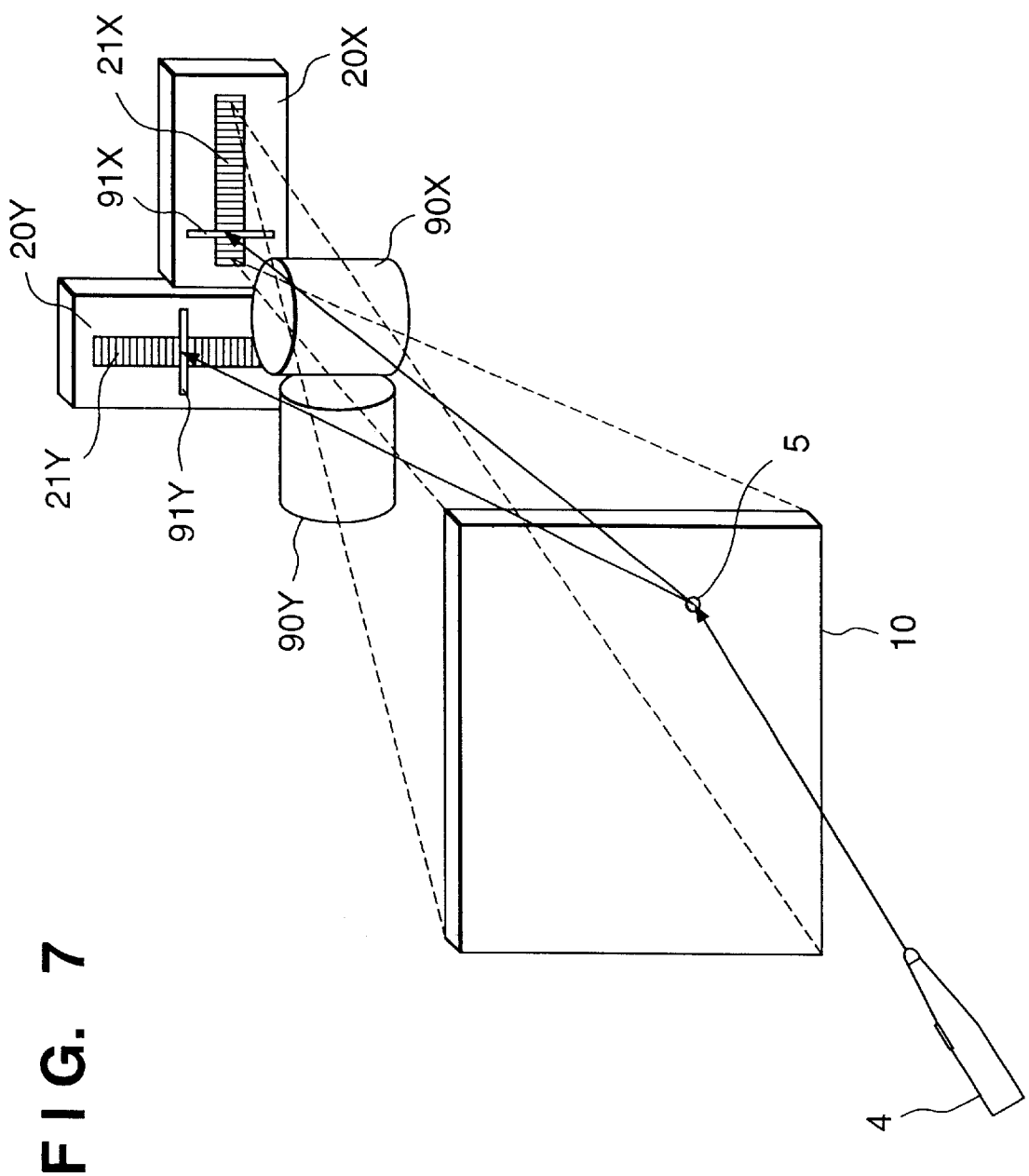
FIG. 7 is a view showing the layout relationship between linear sensors 20X and 20Y of this embodiment.

FIG. 7 is a view showing the layout relationship between the linear sensors 20X and 20Y of this embodiment.

Referring to FIG. 7, the image of the light spot 5 is linearly formed on photosensitive sections 21X and 21Y of the linear sensors 20X and 20Y through cylindrical lenses 90X and 90Y as an imaging optical system. When the linear sensors 20X and 20Y are accurately laid out to make right angles, outputs having peaks in pixels that reflect the X- and Y-coordinates are obtained.

The two linear sensors 20X and 20Y are controlled by the sensor control section 31. The output signals are sent as digital signals to the coordinate calculation section 32 by an A/D conversion section 31A connected to the sensor control section 31. The coordinate calculation section 32 calculates output coordinate values from the input digital signals and sends the calculation results to the externally connected apparatus (not shown) by a predetermined communication method through the communication control section 33 together with the data including the control signal from the control signal detection section 72. To perform operation (e.g., setting user calibration value) different from normal operation in an adjustment mode, a mode switching signal is sent from the communication control section 33 to the sensor control section 31 and coordinate calculation section 32.

In the present invention, focus is adjusted such that the image of the light spot 5 has a width several times that of a pixel of the linear sensor 20X or 20Y, thereby intentionally generating a blur. According to an experiment using a plastic cylindrical lens having a diameter of 1.5 mm, a linear CCD having a pixel pitch of 15 $\mu$m and 64 effective pixels, and an infrared LED, when the sharpest image was formed, the image width was 15 $\mu$m or less across a view angle of about 40°. It was found that in this state, the pixel dividing calculation result was distorted in a stairwise shape. When the lens position was adjusted to obtain an image width of about 30 to 60 $\mu$m, very smooth coordinate data were obtained. If the blur is large, the peak level becomes low. Hence, an image width corresponding to several pixels is optimum. One of the important points of the present invention is use of a CCD with a small number of pixels and an optical system with an appropriate blur. When this combination is used, an inexpensive coordinate input apparatus having very high resolving power, high accuracy, and high speed can be implemented by a small sensor and optical system with a small calculation data amount.

The X-coordinate detection linear sensor 20X and Y-coordinate detection linear sensor 20Y, which are laid out in an array, have identical arrangements, and details thereof will be described with reference to FIG. 8.

Figure 8:
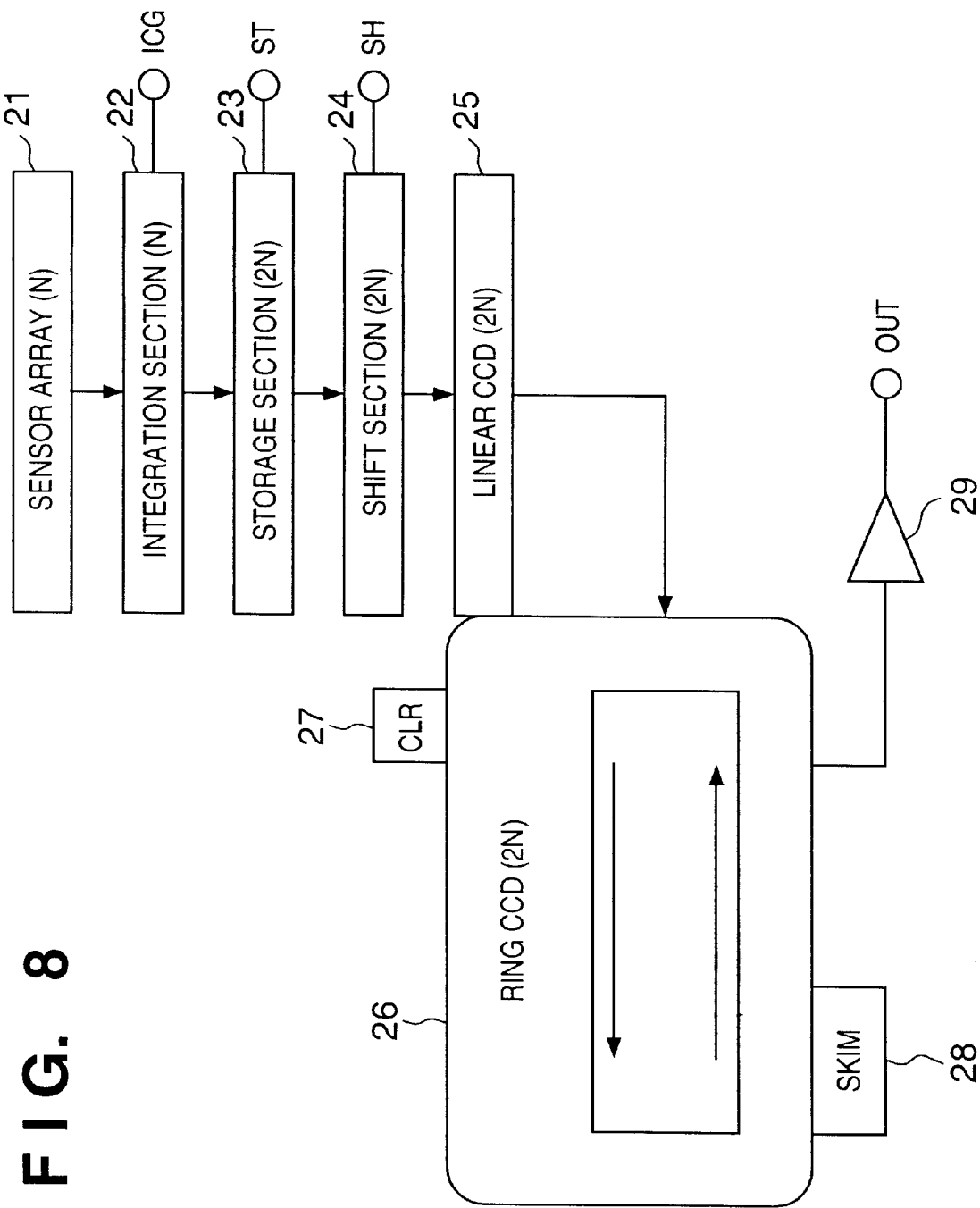
FIG. 8 is a block diagram showing the detailed arrangement of the linear sensor of this embodiment.

FIG. 8 is a block diagram showing the detailed arrangement of the linear sensor of this embodiment.

A sensor array 21 as a light-receiving section has N pixels (64 pixels in this embodiment). Charges corresponding to the received light amount are stored in integration sections 22. The integration sections 22 comprise N integration sections. Since the integration sections 22 can be reset by applying a voltage to a gate ICG, electronic shutter operation is possible. The charges stored in the integration sections 22 are transferred to storage sections 23 when a pulse voltage is applied to an electrode ST. The storage sections 23 comprise 2N storage sections 23 which independently store the charges in corresponding to H (high level) and L (low level) of an IRCLK signal synchronized with the light emission timing of the pointing tool 4. The charges independently stored in synchronism with ON/OFF of light are transferred to 2N linear CCD sections 25 through 2N shift sections 24 provided to simplify the transfer clock.

The linear CCD sections 25 store charges arranged adjacent to each other in correspondence with ON/OFF of light in the sensor outputs from the N pixels. The charges arranged in the linear CCD sections 25 are sequentially transferred to 2N ring CCD sections 26. The ring CCDs 26 are cleared by a CLR section 27 in accordance with a CLR signal and then sequentially store the charges from the linear CCD sections 25.

The charges thus stored are read by an amplifier 29. This amplifier 29 outputs a voltage in proportion to the stored charge amount non-destructively. Actually, the difference between adjacent charge amounts, i.e., a value obtained by subtracting the charge amount in the OFF state of the light-emitting element 41 from that in the ON state is amplified and output.

Examples of resultant output waveforms from the linear sensors 20X and 20Y will be described with reference to FIG. 9.

Figure 9:
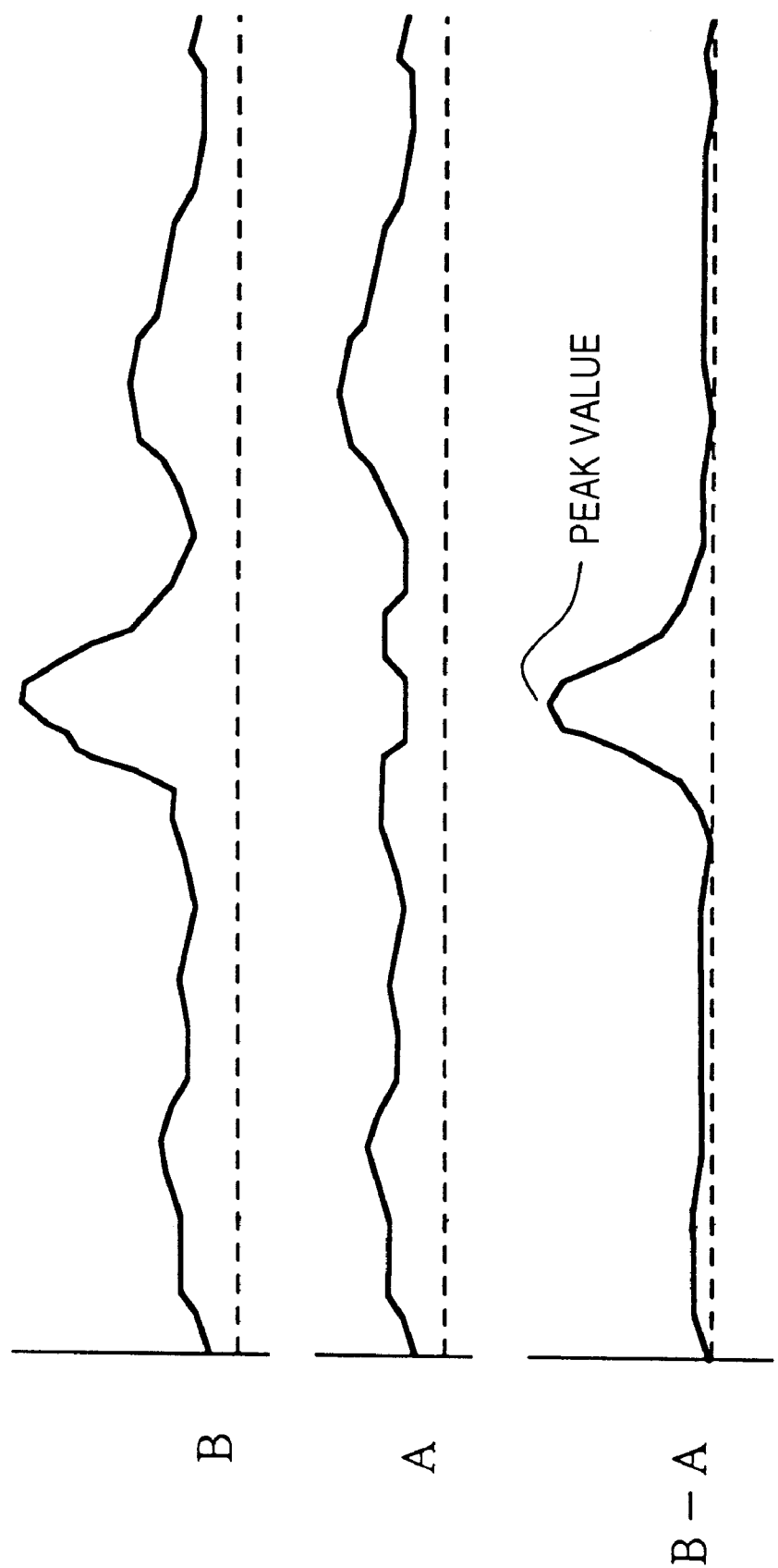
FIG. 9 is a graph showing examples of output waveforms from the linear sensors of this embodiment.

FIG. 9 is a graph showing examples of output waveforms from the linear sensors of this embodiment.

Referring to FIG. 9, a waveform B is obtained by reading only a signal in the ON state of the light-emitting element 41. A waveform A is obtained in the OFF state, i.e., the waveform of only disturbance light (as shown in FIG. 8, charges of pixels corresponding to the waveforms A and B are arranged adjacent to each other and stored in the ring CCDs 26). The amplifier 29 non-destructively amplifies and outputs the difference value (waveform (B–A)) between adjacent charge amounts. With this operation, only the signal of an optical image from the pointing tool 4 can be obtained. Hence, stable coordinate input can be performed without any influence of disturbance light (noise).

The maximum value of the waveform (B–A) shown in FIG. 9 is defined as a PEAK value. When the storage time in which the linear sensors 20X and 20Y sense light is increased, the PEAK value becomes large in correspondence with the time. In other words, time corresponding to one period of the IRCLK signal is used as a unit storage time, and a storage count n is defined on the basis of this unit storage time. When the storage count n is increased, the PEAK value becomes large. By detecting that the PEAK value has reached a predetermined magnitude TH1, an output waveform with a predetermined quality can always be obtained.

Figure 10:
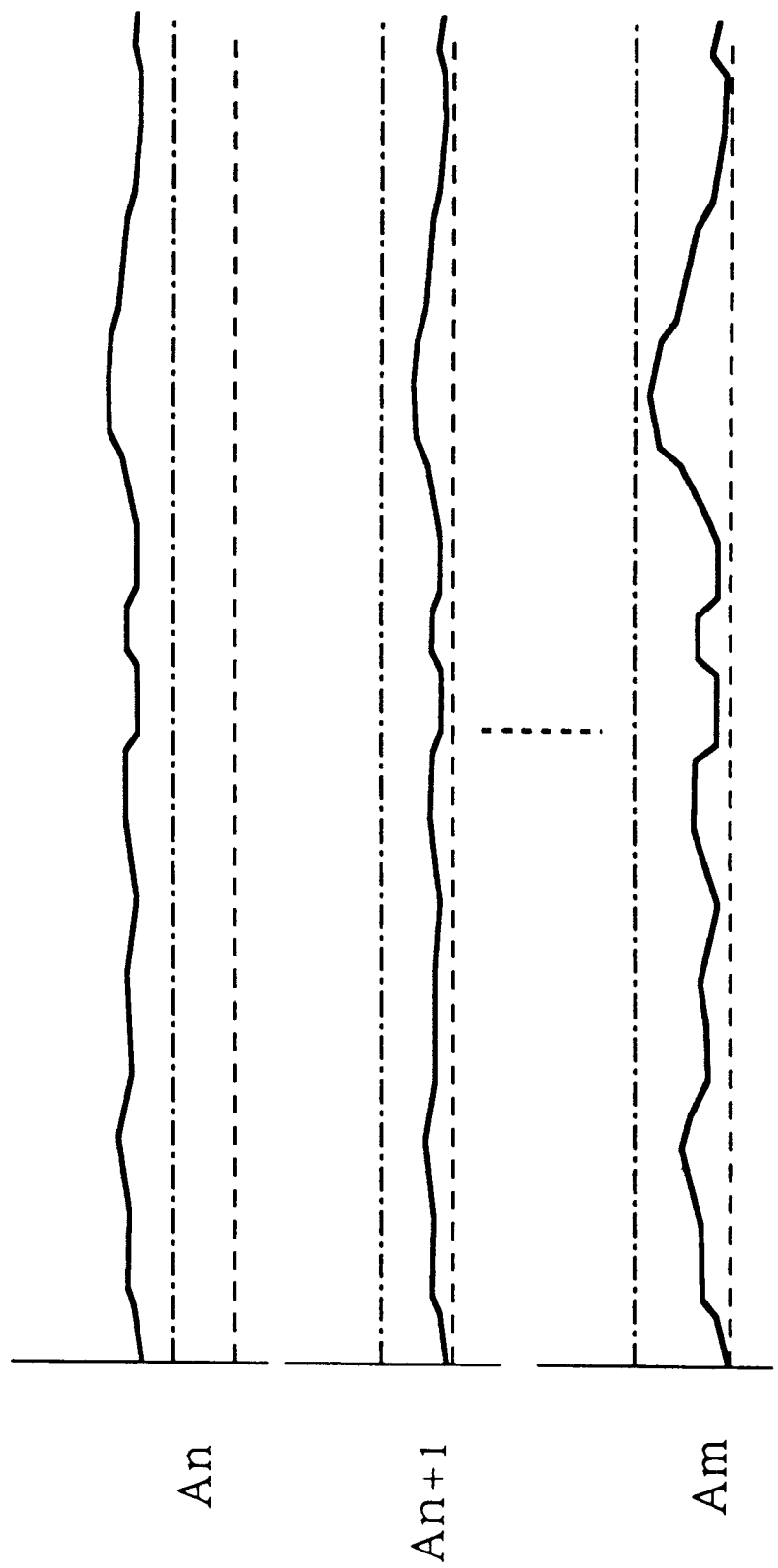
FIG. 10 is a graph showing examples of output waveforms in order to explain skim operation of the linear sensor of this embodiment.

On the other hand, when disturbance light is very strong, the transferred charges in the ring CCDs 26 may saturate before the peak of the difference waveform (B–A) has a sufficient magnitude. In consideration of such case, each of the linear sensors 20X and 20Y has a SKIM section 28 having a skim function. The SKIM section 28 monitors the level of OFF signal. Referring to FIG. 10, when the signal level exceeds a predetermined value for a waveform An of nth time (alternate long and short dashed line), a predetermined amount of charges are removed from pixels of A and B. In the next (n+1)th time, a waveform (An+1) is obtained. By repeating this operation, signal charges can be continuously stored without saturation even when the disturbance light is very strong.

Hence, if the amount of blinking light from the pointing tool 4 is small, a signal waveform having a sufficient magnitude can be obtained by continuously performing integration operation a number of times. Especially when a light source in the visible light range is used in the pointing tool 4, signals of the displayed image superpose. In this case, a sharp waveform with minimum noise can be obtained using the above-described skim function and difference output.

Operation control of the linear sensors 20X and 20Y will be described next with reference to FIG. 11.

Figure 11:
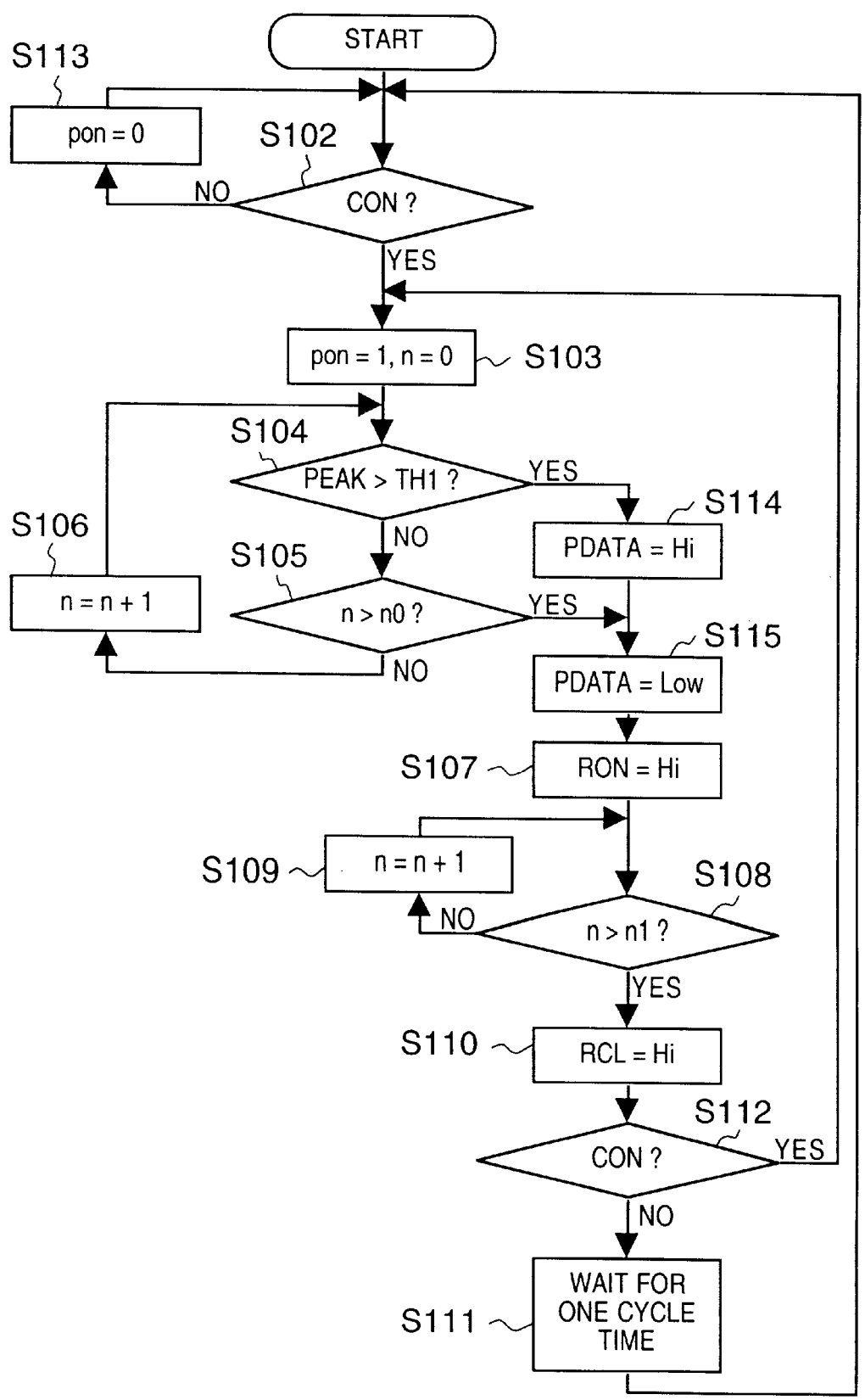
FIG. 11 is a flow chart showing linear sensor operation control of this embodiment.

FIG. 11 is a flow chart showing linear sensor operation control of this embodiment.

When the sensor control section 31 starts sensor control operation, the signal CON is monitored in step S102. If the signal CON is at high level (YES in step S102), the flow advances to step S103 to reset the storage count n to 0. In step S104, it is determined whether the PEAK value (peak level) of the sensor output is larger than the predetermined value TH1.

If the PEAK value is equal to or smaller than the predetermined value TH1 (NO in step S104), it is determined in step S105 whether the storage count n is larger than a first predetermined count n0. If the storage count n is equal to or smaller than the first predetermined count n0 (NO in step S105), the flow advances to step S106 to increment the storage count n by one and then returns to step S104. On the other hand, when the PEAK value is larger than the predetermined value TH1 (YES in step S104), i.e., when a sufficient light amount is stored, and a sufficient signal level for accurate coordinate value calculation is obtained, the flow advances to step S114 to set flag PDATA as a level control signal to Hi. If the storage count n is larger than the first predetermined count n0 (YES in step S105), i.e., when no sufficient light amount is stored, the flow advances to step S115 to set the flag PDATA as a level control signal to Low.

In step S107, an integration stop signal RON goes high (H) to stop integration operation. The coordinate calculation section 32 starts coordinate value calculation.

In step S108, it is determined whether the storage count n is larger than a second predetermined count n1. If the storage count n is equal to or smaller than the second predetermined count n1 (NO in step S108), the flow advances to step S109 to increment the storage count n by one and then returns to step S108. If the storage count n is larger than the second predetermined count n1 (YES in step S108), the flow advances to step S110 to set the integration stop signal RON to low level and simultaneously set the sensor reset signal RCL to high level during a period several times (twice in FIG. 10) the period of signal LCK. In step S112, the signal CON is monitored. When the signal CON is at high level (YES in step S112), the flow advances to step S103. If the signal CON is at low level (NO in step S112), the flow advances to step S111 to wait for one processing cycle.

That is, this operation is repeated while the signal CON is at high level. Coordinate values are calculated every period determined by the predetermined count n1. Step S111 is prepared to hold the state only once even when the signal CON drops due to the influence of dust. If the signal CON is at low level continuously for two periods (NO in step S102), the flow advances to step S113 to reset a flag pon to 0. The initial state is restored to wait for the sync signal.

The step as a measure against dropout may be set not for one period but for a longer period. If there is little disturbance, the period may be shorter. The same operation as described above can be performed even when one period herein is set to be a natural number multiple of the period of the above-described data block so as to match with the timing of sync code, and a sync code detection signal is used in place of the signal CON.

Light from the pointing tool 4, which arrives at the coordinate detector, varies due to consumption of the power supply (battery) 44 incorporated in the pointing tool 4 and also due to the posture of the pointing tool 4. Especially, when the screen 10 has poor light diffusion properties, the front luminance of a displayed image is improved, though the variation in light amount input to the sensor due to the posture of the pointing tool 4 becomes large. In the present invention, however, even in such case, the integration count automatically follows up to always obtain a stable output signal. For this reason, an excellent effect of enabling stable coordinate detection is obtained. When light from the pointing tool 4 used as a pointer becomes incident on the sensor without large scattering, considerably strong light is incident. Even in this case, stable coordinate detection can be performed.

If the pointing tool 4 serves as both a pointer and a pen using an LED in direct contact with the screen, an LED with a larger light amount can be used. Discrimination between the pen and the pointer may be done on the basis of an ID signal to switch between the first predetermined count n0 and the second predetermined count n1 as the integration count shown in FIG. 11 such that sampling is performed at a high speed for the pen and at a low speed for the pointer. In fact, fine drawing operation such as character input is impossible with the pointer, and drawing a smooth line by low-speed sampling is more convenient. For this reason, such switching can be effectively provided.

As described above, a carrier with a high frequency is added to blinking light, and the timing of integration operation is controlled by a demodulated signal having a predetermined period, which is obtained by frequency-detecting the carrier. Hence, the pointing tool and image carrier section can be cordlessly synchronized with each other, so a convenient coordinate input apparatus can be implemented. In addition, when a laser beam is used, the apparatus can be easily operated at a position separated from the screen. Furthermore, since an integration control means for stopping integration operation upon detecting that the peak level in the difference signal from the integration section exceeds a predetermined level, a light spot image signal having almost a predetermined level can be generated even when the light amount changes. Thus, a stable high-resolution coordinate calculation result can always be obtained.

<Coordinate Value Calculation>

Coordinate calculation processing by the coordinate calculation section 32 will be described next with reference to FIG. 12.

Figure 12:
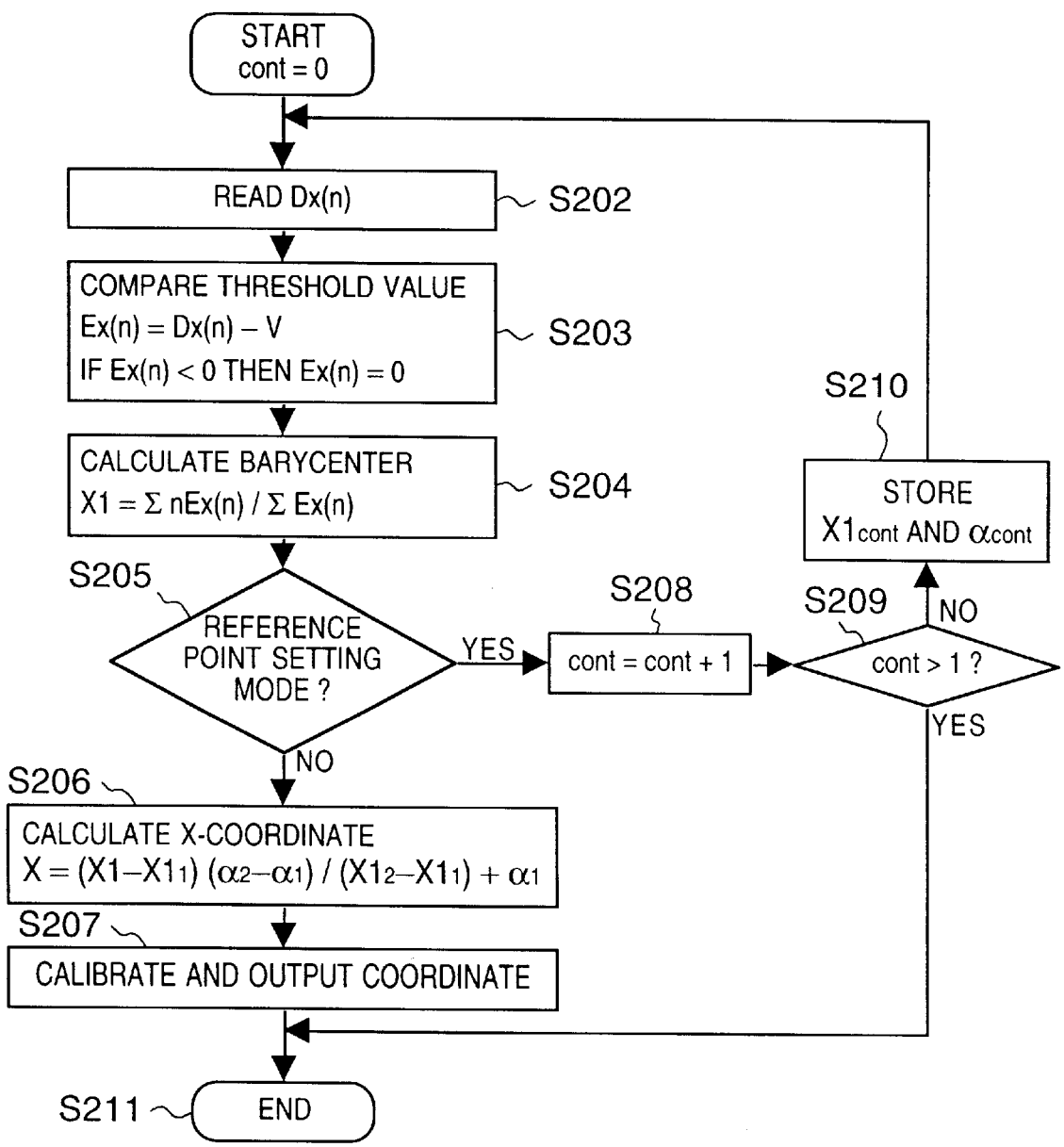
FIG. 12 is a flow chart showing coordinate calculation processing by a coordinate calculation section of this embodiment.

FIG. 12 is a flow chart showing coordinate calculation processing by the coordinate calculation section of this embodiment.

The output signals (difference signals from the amplifiers 29) from the two linear sensors 20X and 20Y, which are obtained by the above described method, are converted into digital signals by the A/D conversion section 31A provided for the sensor control section 31 and sent to the coordinate calculation section 32 to calculate coordinate values. To calculate the coordinate values, first, coordinate values (X1, Y1) on the sensors are obtained for the output data in the X- and Y-coordinate directions. The same calculation processing is performed for X- and Y-coordinate values, and a description thereof will be made for only the X-coordinate value.

First, in step S202, difference data Dx(n) (the pixel count n=64 in this embodiment) as the difference signal of each pixel at an arbitrary coordinate input point (a predetermined point whose coordinates are known in a reference point setting mode to be described later) is read and stored in a buffer memory (not shown), In step S203, the data are compared with a predetermined threshold value V, and a data value Ex(n) equal to or larger than the threshold value is calculated. Using this data value Ex(n), a coordinate X1 on the sensor is calculated in step S204. In this embodiment, the barycenter of output data is calculated by the barycenter method. However, there are a plurality of calculation methods including a method of obtaining the peak value of the data value Ex(n) (e.g., by differentiation).

In step S205, the mode of coordinate calculation processing is determined. To calculate coordinates from a barycenter X1 of output data, predetermined values must be obtained in advance. A method of obtaining the predetermined values (reference point setting mode) will be described.

A description will be made in association with only the X-direction. The pointing tool 4 is located at points ($\alpha$1,$\beta$1) and ($\alpha$2,$\beta$2) whose X- and Y-coordinates on the screen 10 are known, and steps S202 to S204 are executed at each point. The barycentric values of the X-direction sensor, which are obtained at the respective points, are calculated as $X1_1$ and $X1_2$. These values and the known coordinate values $\alpha$1 and $\alpha$2 are stored in step S210. In the normal coordinate calculation mode, in step S206, the X-coordinate of the coordinate input point to be calculated can be calculated using the stored values. In step S207, aiming at providing a coordinate input apparatus with higher performance, the coordinate values are calibrated (e.g., to correct lens aberration of the optical system, the distortion is corrected by software calculation) as needed to determine the coordinate values.

The determined coordinate values can be directly output in real time. Alternatively, the data may be thinned (e.g., only one data is output every 10 determined coordinates) in accordance with the purpose. This is important in assuming the following specifications.

The user hand stability changes between a case wherein the pointing tool 4 is used as a pen and that wherein the pointing tool 4 is used as a pointer separately from the screen. When the pointing tool 4 is used as a pointer, the cursor on the screen finely vibrates. In this case, it is convenient to suppress the fine motion. On the other hand, when the pointing tool 4 is used as a pen, follow-up as faithful and quick as possible is required. Especially, characters cannot be correctly input unless fine and quick operation is possible.

In this embodiment, an ID is transmitted by a control signal to determine whether the pointing tool 4 is used as a pointer, i.e., whether the switch at the distal end is pressed. Hence, it can be determined whether the pointing tool 4 is used as a pointer or pen. If the pointing tool 4 is used as a pointer, for example, the moving average is calculated using two previously output coordinate values (X-1,Y-1) and (X-2,Y-2) to calculate the current coordinate values (X,Y). With this arrangement, the blur can be reduced, and the operability can be improved. Although a simple moving average is used, as a function to be used for smoothing, various schemes can be used, including a scheme of non-linearly compressing the absolute difference value in accordance with its magnitude or a scheme of non-linearly compressing the difference from a predicted value by a moving average. More specifically, when the pointing tool 4 is used as a pointer, smoothing can be switched to a relatively high level, and otherwise, smoothing is switched to a relatively low level by the control signal. From this point, the present invention can provide an excellent effect because convenient states can be realized for the respective cases.

These calculations only need be complete within 10 msec when the coordinate sampling frequency is 100 Hz, as described above. The original data is in a very small amount because it contains 64 pixels×2 (x and y)×8 bits of A/D conversion section. In addition, no convergence calculation is necessary. Hence, the data can be sufficiently processed by a low-speed 8-bit one-chip microprocessor. This is advantageous in cost. In addition, since the specifications can be easily changed, the development period can be shortened, and various derivative products can be easily developed. Especially, a dedicated LSI for high-speed image data processing need not be developed, unlike an apparatus using an area sensor, so it is very advantageous in development cost and period.

The data signal representing the coordinate values (X,Y) calculated by the above-described calculation is sent from the coordinate calculation section 32 to the communication control section 33. The communication control section 33 receives the data signal and the control signal from the CLR section 72. The data signal and control signal are converted into communication signals in a predetermined format and sent to an external display control apparatus. Thus, the cursor or menu on the screen 10 can be operated to perform various operations including inputting characters or line drawings. As described above, even when the sensor with 64 pixels is used, resolving power for 1,000 or more coordinates and sufficient accuracy can be obtained. Hence, a coordinate input apparatus in which both the sensor and the optical system can have an inexpensive and compact arrangement, and the calculation circuit can also have an arrangement in very small scale can be obtained.

When the sensor is designed as an area sensor, and resolving power is to be doubled, the number of pixels and the quantity of calculation data must be four times. However, when the sensor is designed as a linear sensor, the number of pixels for each of the X- and Y-coordinates only need be doubled. Hence, the number of pixels can be increased to further increase the resolving power.

As described above, according to this embodiment, signals in the ON and OFF states of a light spot that is blinked at a predetermined period by the pointing tool are independently integrated, and the difference signal between the signals is calculated. Thus, the position of a pixel at the peak level can be accurately calculated. In addition, a compact, light-weight, and inexpensive apparatus capable of obtaining highly accurate and high-resolution coordinate values and suppressing the influence of disturbance light can be implemented.

<Description Related to Screen>

The screen 10 used in the above-described apparatus will be described with reference to FIG. 13.

Figure 13:
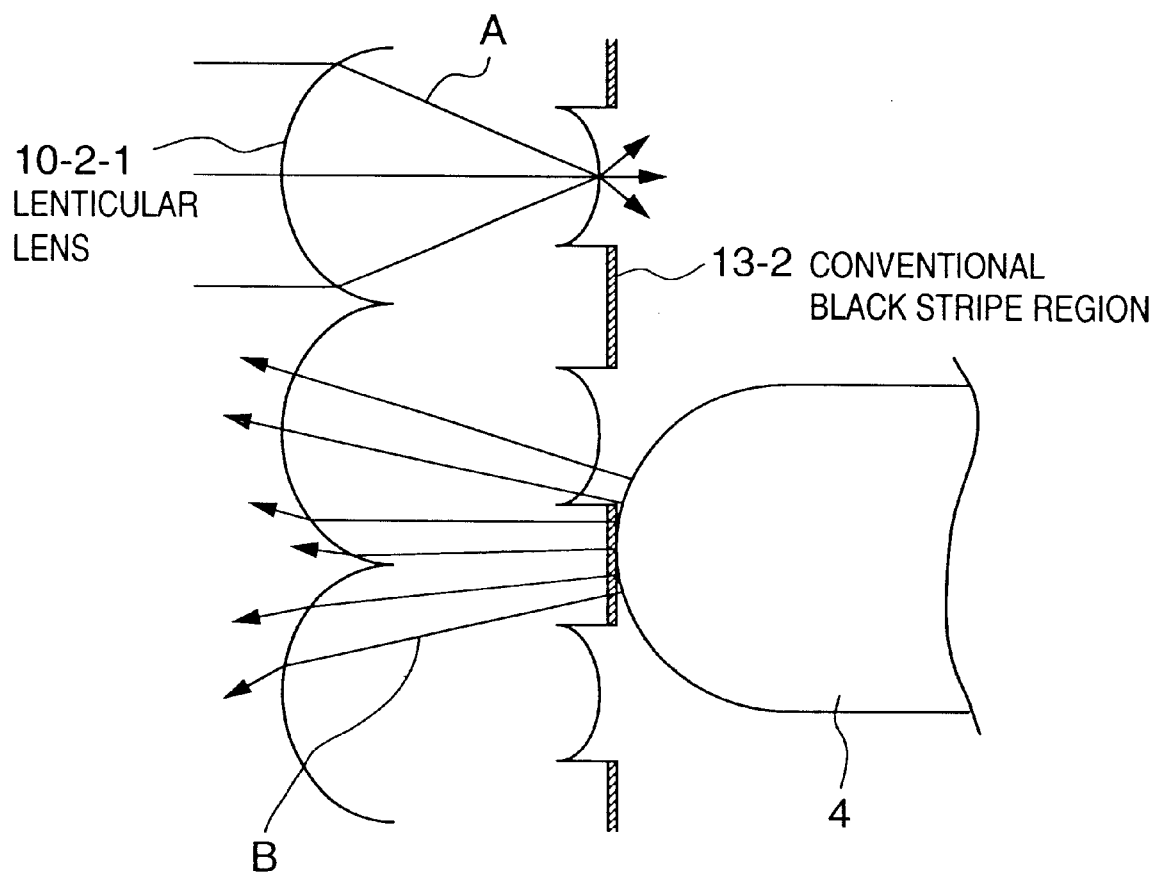
FIG. 13 is a view showing an arrangement of the screen of this embodiment.

FIG. 13 is a view showing an arrangement of the screen of this embodiment.

As described above, the screen 10 is constructed by the Fresnel plate 10-1 formed from Fresnel lenses for collimating an image light beam from the projecting lens 86 and the lenticular plate 10-2 formed from lenticular lenses for horizontally diffusing the light beam.

FIG. 13 especially shows the horizontal sectional structure of the lenticular plate 10-2. Lenticular lenses 10-2-1 diffuse an image light beam A from the projecting lens 86, which is almost collimated by the Fresnel lenses, in the horizontal direction, as shown in FIG. 13. In the arrangement shown in FIG. 13, the lenticular lenses 10-2-1 are provided on both surfaces. On the observation-side surface (coordinate input surface) of the lenticular plate 10-2, projecting flat surfaces are formed in regions other than the lenses of the lenticular lenses 10-2-1, and black stripes 10-2-2 are formed on the flat surfaces to prevent reflection of external light.

The black stripes 10-2-2 are formed by applying, by printing, a coating which absorbs light components in the visible light range and has a satisfactory transmission characteristic for the wavelength range of infrared light emitted from the pointing tool 4. For example, when infrared light emitted from the pointing tool 4 falls within the wavelength range from 800 to 960 nm centered on 880 nm, the black stripes 10-2-2 has a light beam transmission characteristic as shown in FIG. 14.

Figure 14:
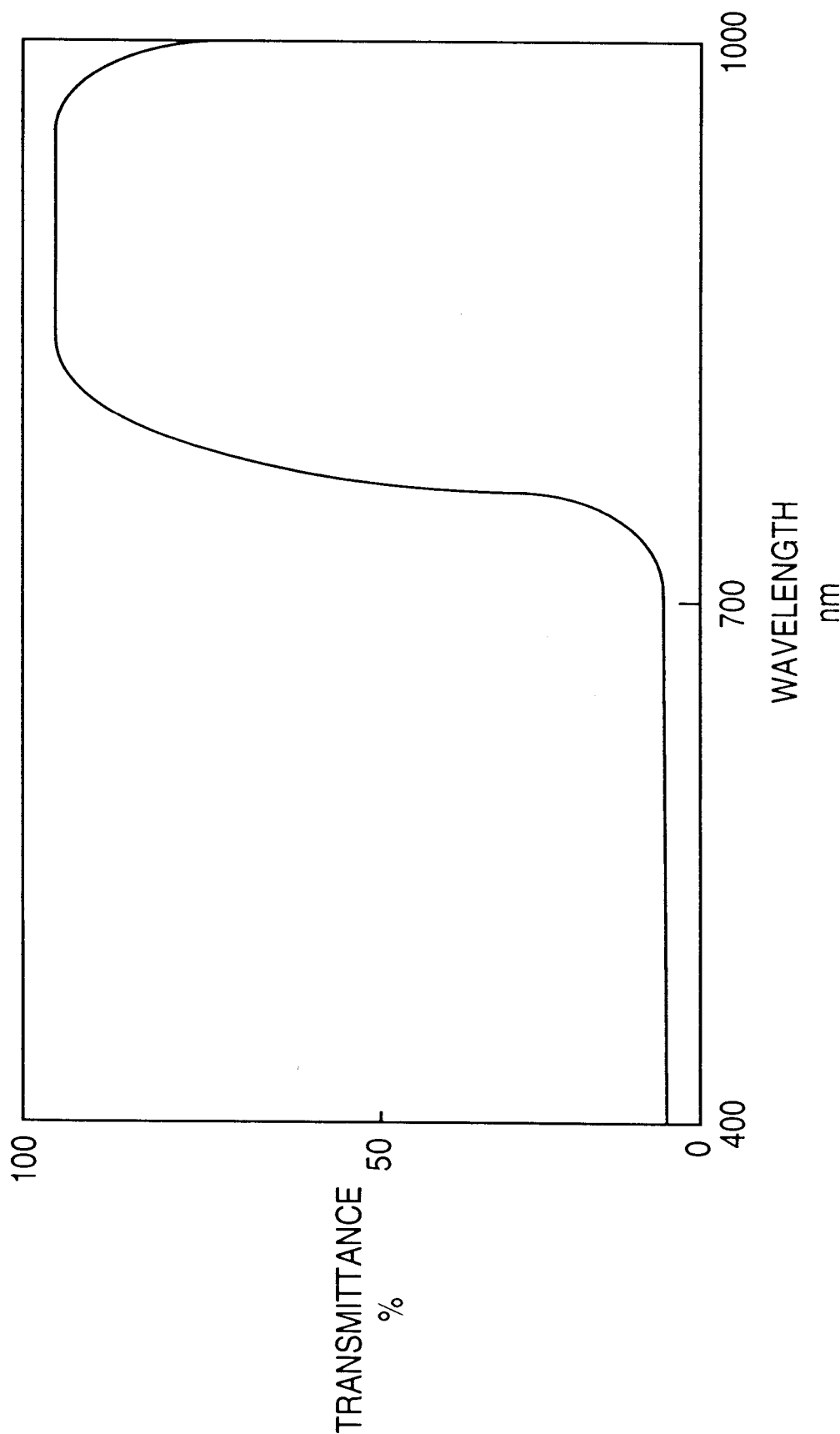
FIG. 14 is a graph showing an optical characteristic of the screen of this embodiment.

FIG. 14 is a graph showing the optical characteristic of the screen of this embodiment.

An infrared light beam B emitted from the pointing tool 4 in FIG. 13 is transmitted through the screen 10 at portions other than the black stripes 10-2-2 without any problem. Of the infrared light beam B, light components incident on the black stripes 10-2-2 having the optical characteristics are also transmitted through the screen 10 almost without loss and efficiently become incident on the coordinate detection sensor section 2. The black stripes 10-2-2 which absorb visible light without passing it and prevent external light reflection as a black coating can improve the contrast of a projected image. The light beam transmission characteristic of the black stripes 10-2-2 shown in FIG. 14 is not limited to the above-described characteristic and is changed in accordance with the wavelength range of infrared light emitted from the pointing tool 4.

Figure 15:
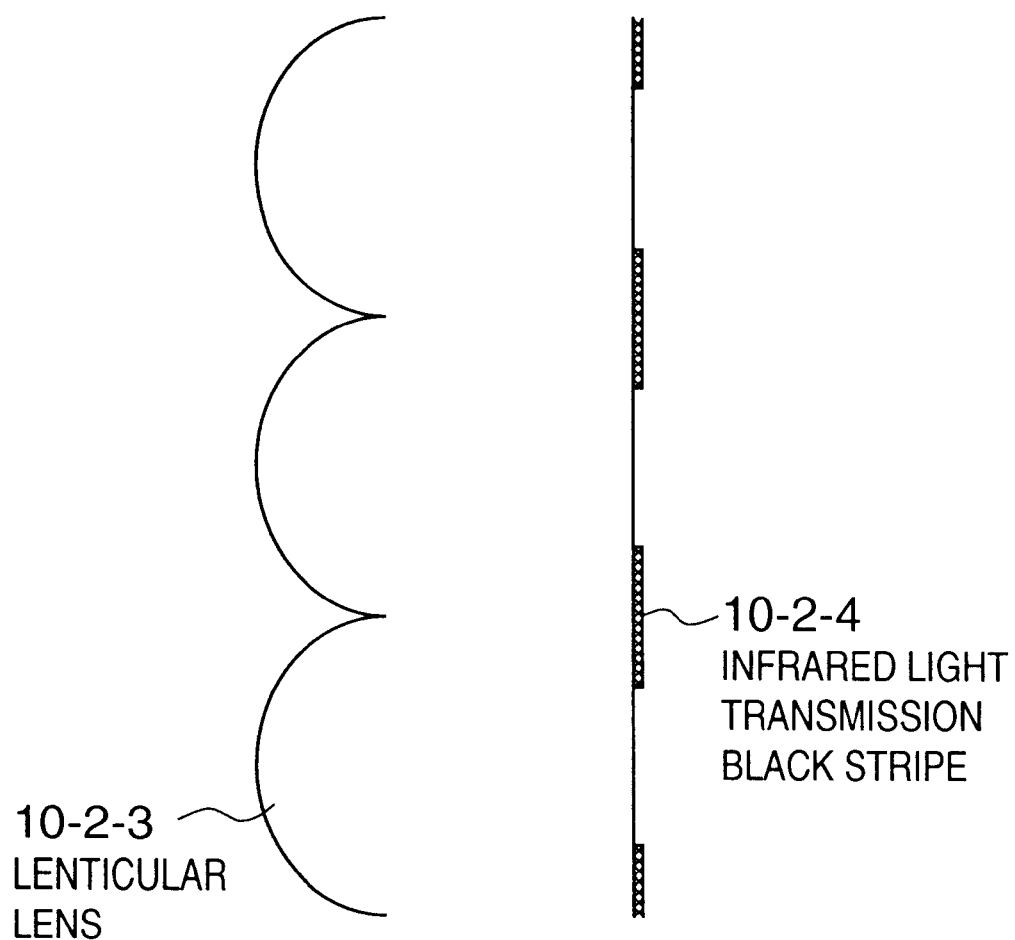
FIG. 15 is a view showing another arrangement of the screen of this embodiment.

FIG. 13 shows a lenticular plate having lenticular lenses on both surfaces. However, to prevent a step loss of an infrared light beam from the pointing tool 4 from the coordinate input surface side, the lenticular plate may have an arrangement in which lenticular lenses 10-2-3 are formed on only one surface opposing the coordinate input side, and black stripes 10-2-4 are formed by applying a coating which absorbs light components in the visible light range except the image light beam transmission portion and has a satisfactory transmission characteristic for the wavelength range of infrared light emitted from the pointing tool 4, as shown in FIG. 15. The black stripes having the above optical characteristics may be formed not only on the lenticular plate for horizontal diffusion but also on a lenticular plate for vertical diffusion.

The black stripes of the present invention need not always be formed by applying a coating. Instead, filters 10-2-5 may be formed, as shown in FIG. 16, as far as they can form regions which absorb light components in the visible light range except the image light beam transmission portion and have a satisfactory transmission characteristic for the wavelength range of infrared light emitted from the pointing tool 4.

The filters 10-2-5 are formed by mixing a dye which absorbs light components in the visible light range except the image light beam transmission portion and has a satisfactory transmission characteristic for the wavelength range of infrared light emitted from the pointing tool 4 into a resin or the like and adjusting the absorbance by the concentration of the dye and thickness in the transmission direction. The filters may also be formed by bonding films having the same characteristic as described above. The filters may also be formed using another material such as a compound semiconductor having special lattice distortion and refractive index degenerating at a specific wavelength as far as the material has the above optical characteristics.

Figure 16:
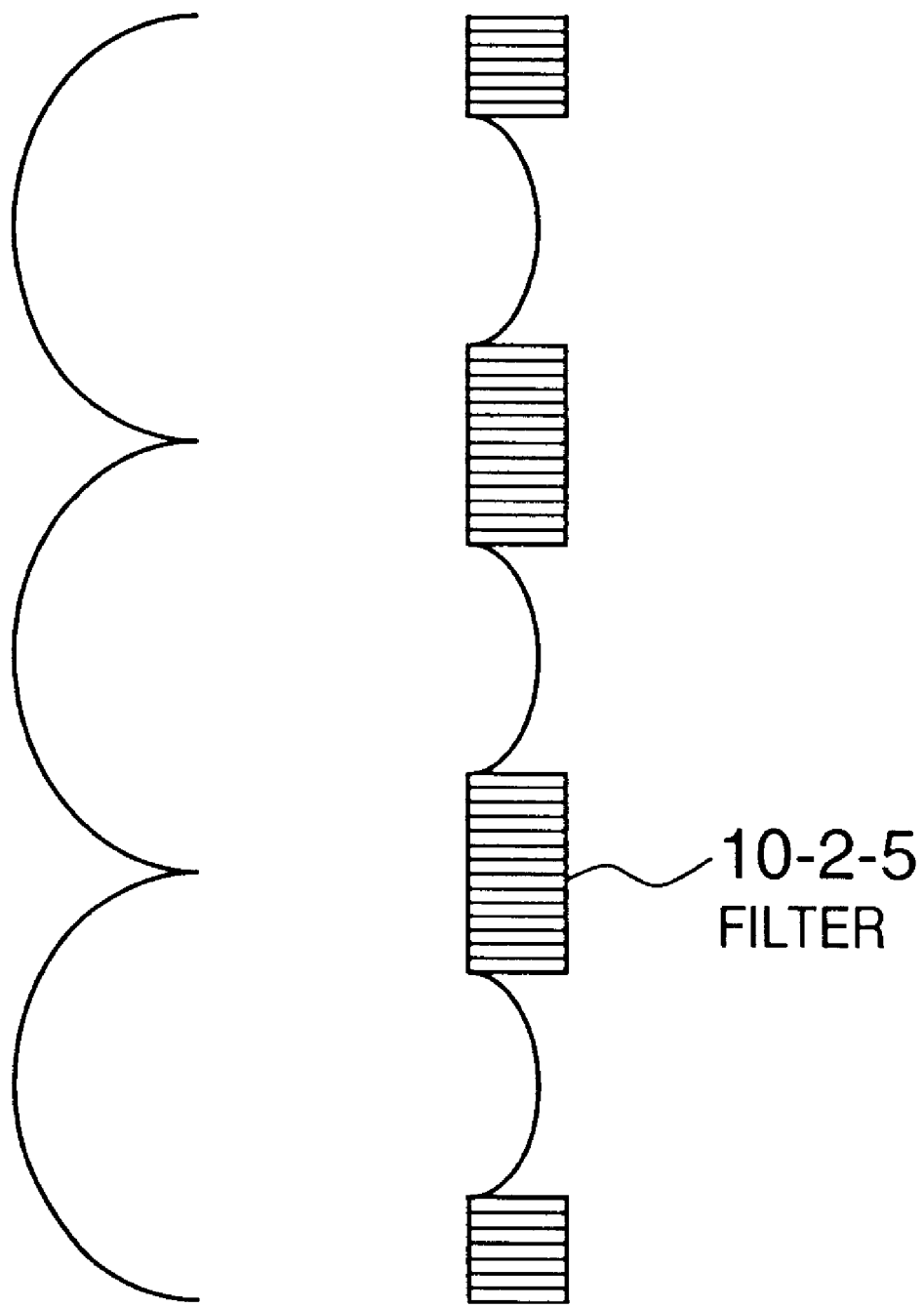
FIG. 16 is a view showing still another arrangement of the screen of this embodiment.
Figure 17:
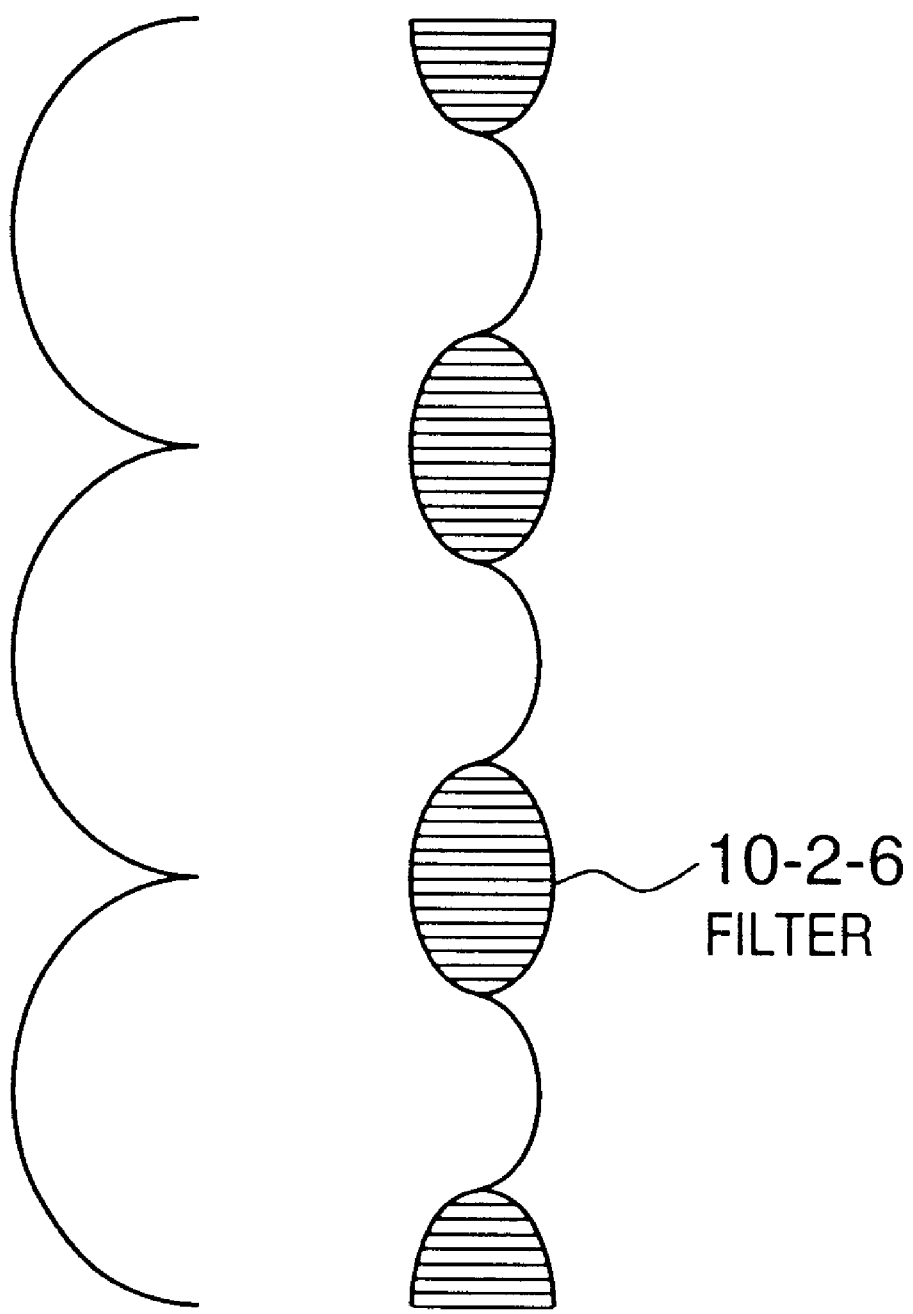
FIG. 17 is a view showing still another arrangement of the screen of this embodiment.

Referring to FIG. 16, black stripes having the same shape as in FIG. 13 are formed by the filters 10-2-5 each having a rectangular section. However, as shown in FIG. 17, filters 10-2-6 each having a curved surface may be formed such that the distal end of the pointing tool 4 can smoothly come into contact with the screen.

Figure 18:
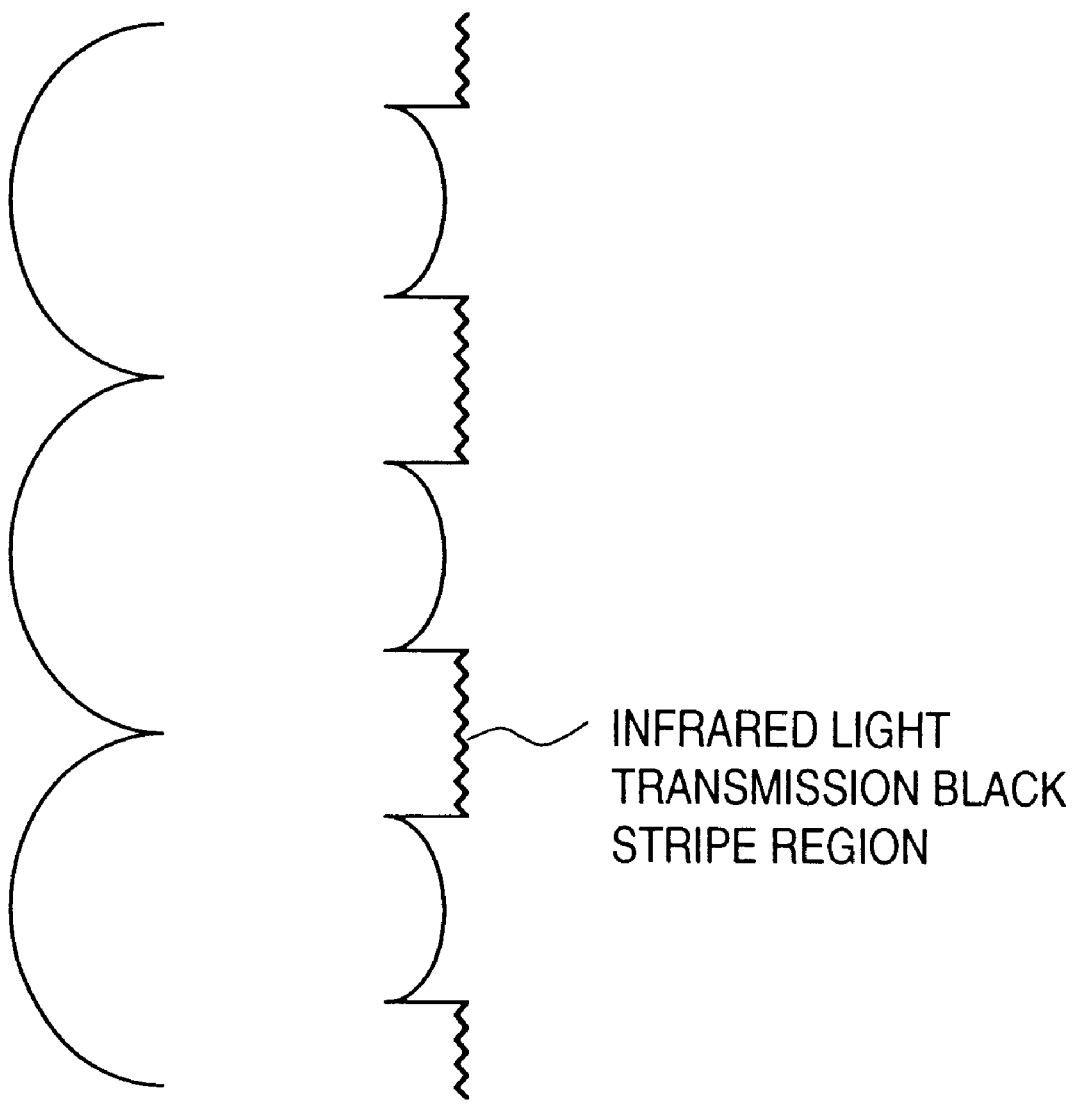
FIG. 18 is a view showing still another arrangement of the screen of this embodiment.

FIG. 18 shows an arrangement in which the surface of the black stripes shown in FIG. 13, which are formed by applying a coating which absorbs light components in the visible light range except the image light beam transmission portion and has a satisfactory transmission characteristic for the wavelength range of infrared light emitted from the pointing tool 4, are matted, thereby further increasing the effect of preventing external light reflection.

Figure 19:
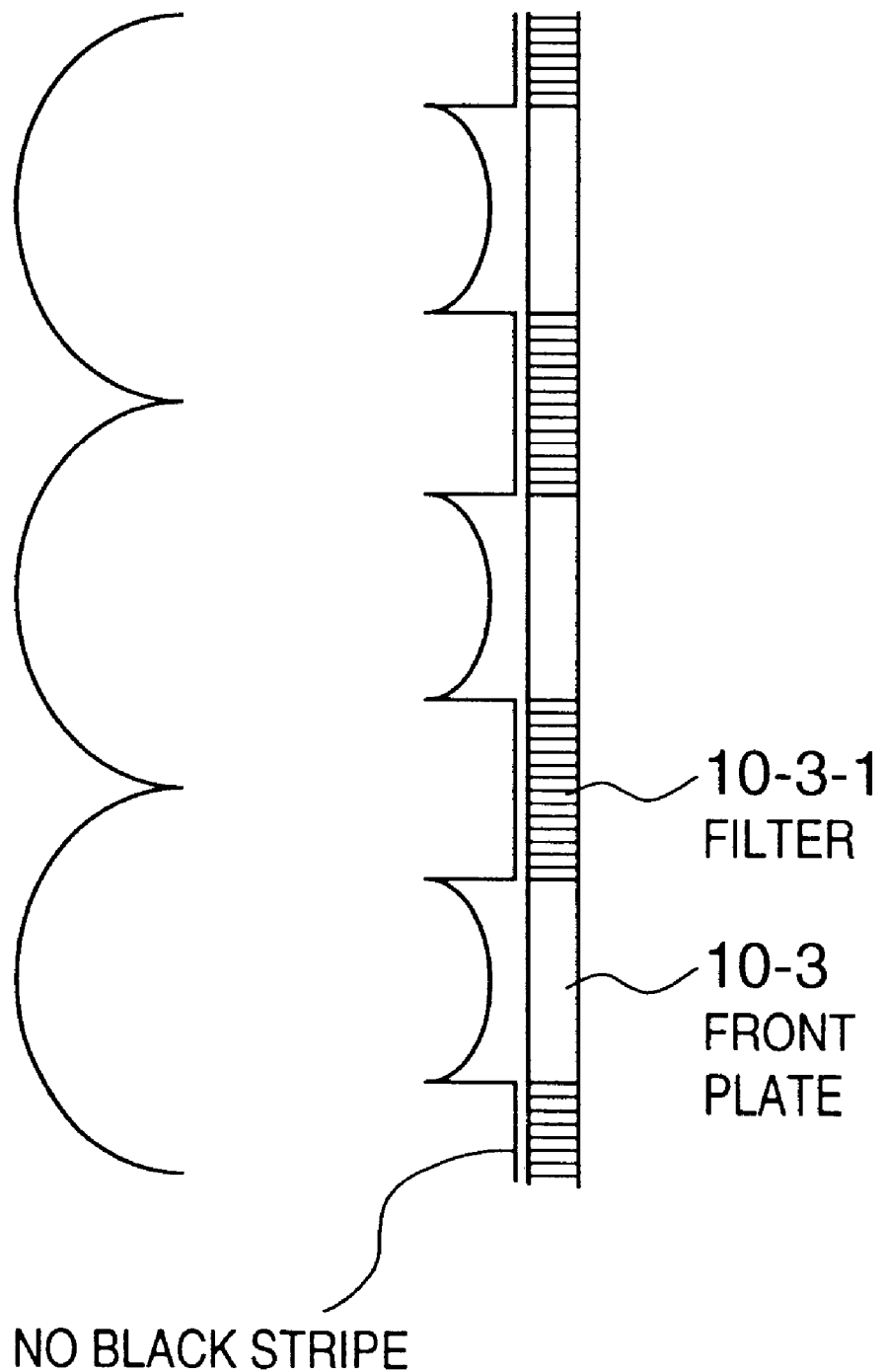
FIG. 19 is a view showing still another arrangement of the screen of this embodiment.

As shown in FIG. 19, instead of forming the black stripe regions having the above optical characteristics on the lenticular plate 10-2, a front plate 10-3 having the above optical characteristics may be provided on the front surface. Referring to FIG. 19, in correspondence with the flat surfaces other than the image light beam transmission portions of the lenticular plate 10-2, stripe-shaped filter regions 10-3-1 which absorb light components in the visible light range except the image light beam transmission portion and have a satisfactory transmission characteristic for the wavelength range of infrared light emitted from the pointing tool 4 are on the front plate. When the lenticular plate and the plate having the stripe-shaped filter regions are formed from different members, for example, the filter members can be easily incorporated into the lenticular plate, and productivity can be improved.

Figure 20:
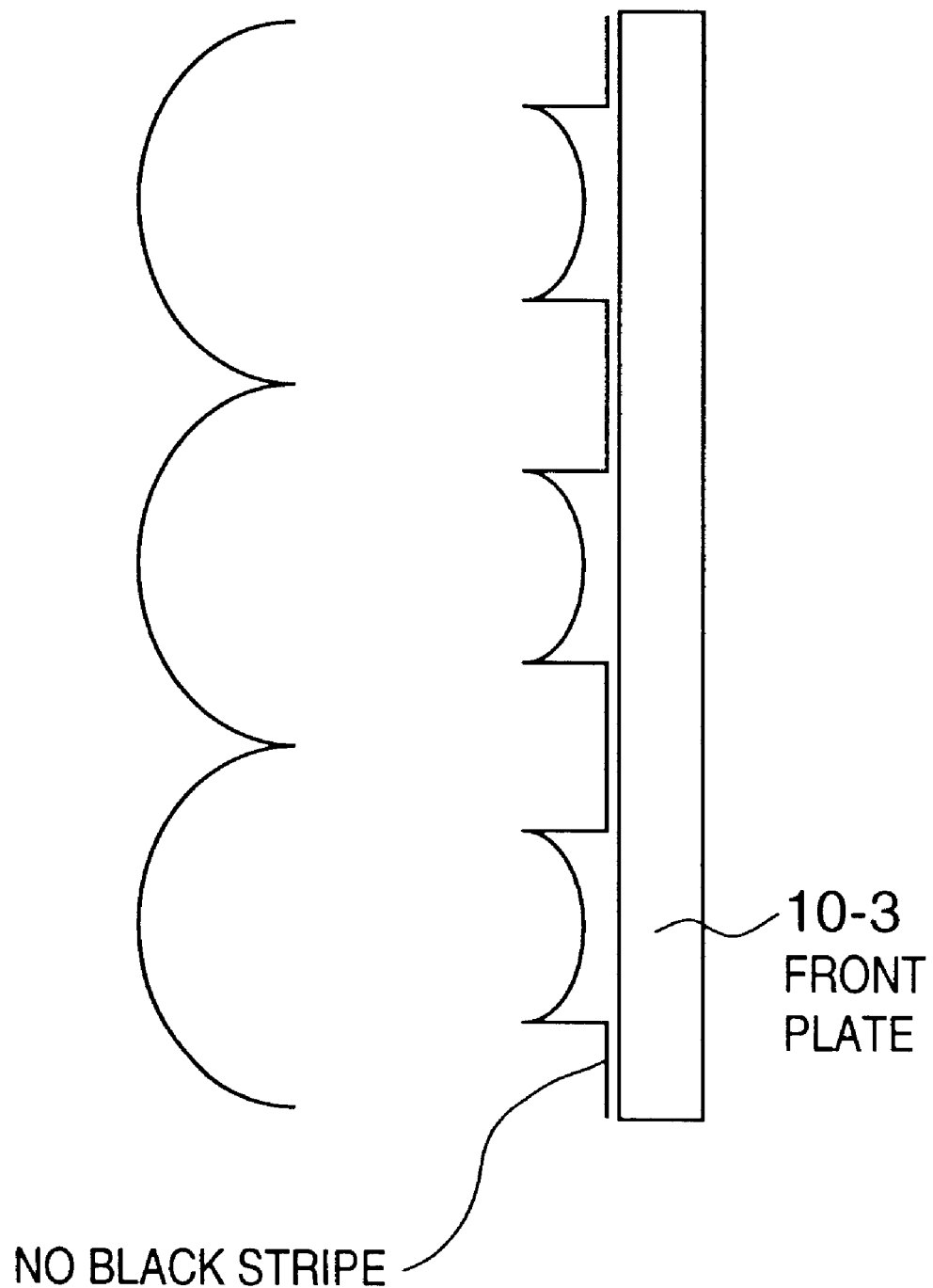
FIG. 20 is a view showing still another arrangement of the screen of this embodiment.

Alternatively, as shown in FIG. 20, instead of forming the black stripe regions having the above optical characteristics on the lenticular plate 10-2, the filter front plate 10-3 which absorbs light components in the visible light range except the image light beam transmission portion and has a satisfactory transmission characteristic for the wavelength range of infrared light emitted from the pointing tool 4 may be provided in the entire region. This arrangement ensures contrast in the entire region, easily prevents external light reflection without fine position adjustment between the lenticular plate 10-2 and the front plate 10-3, and also allows the coordinate detector 1 to receive a sufficient amount of infrared light from the pointing tool 4.

Figure 21:
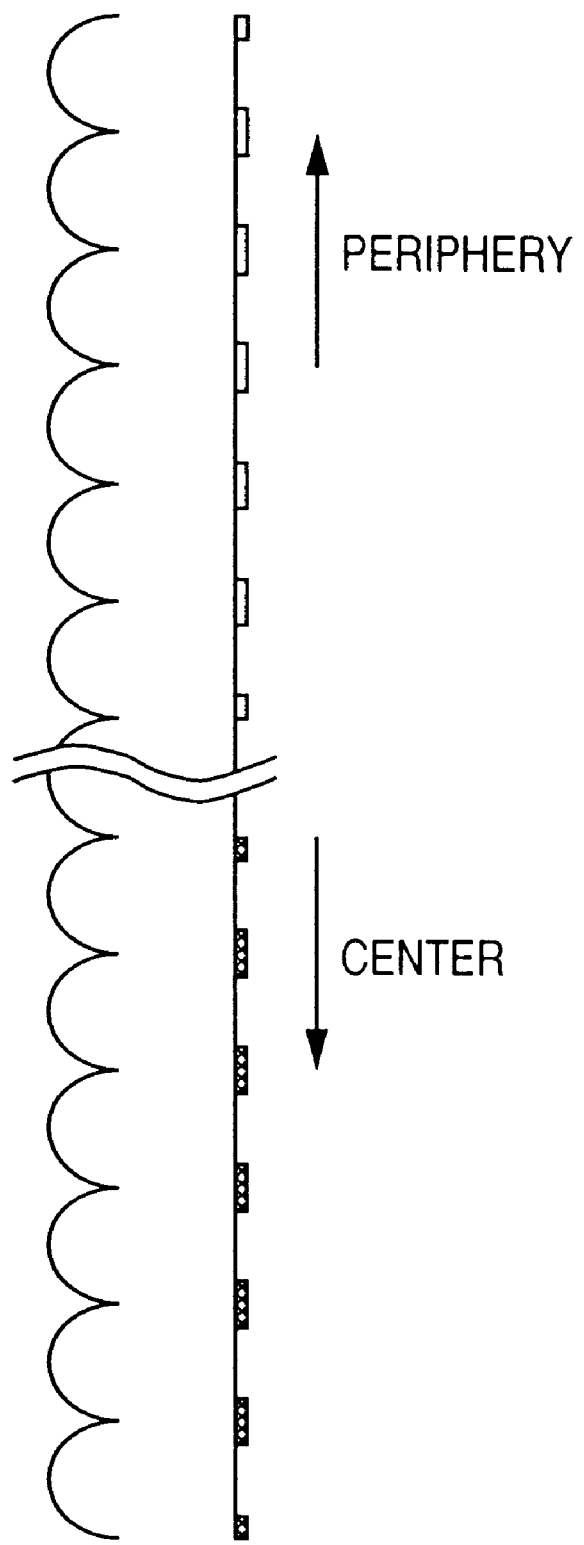
FIG. 21 is a view showing still another arrangement of the screen of this embodiment.
Figure 22:
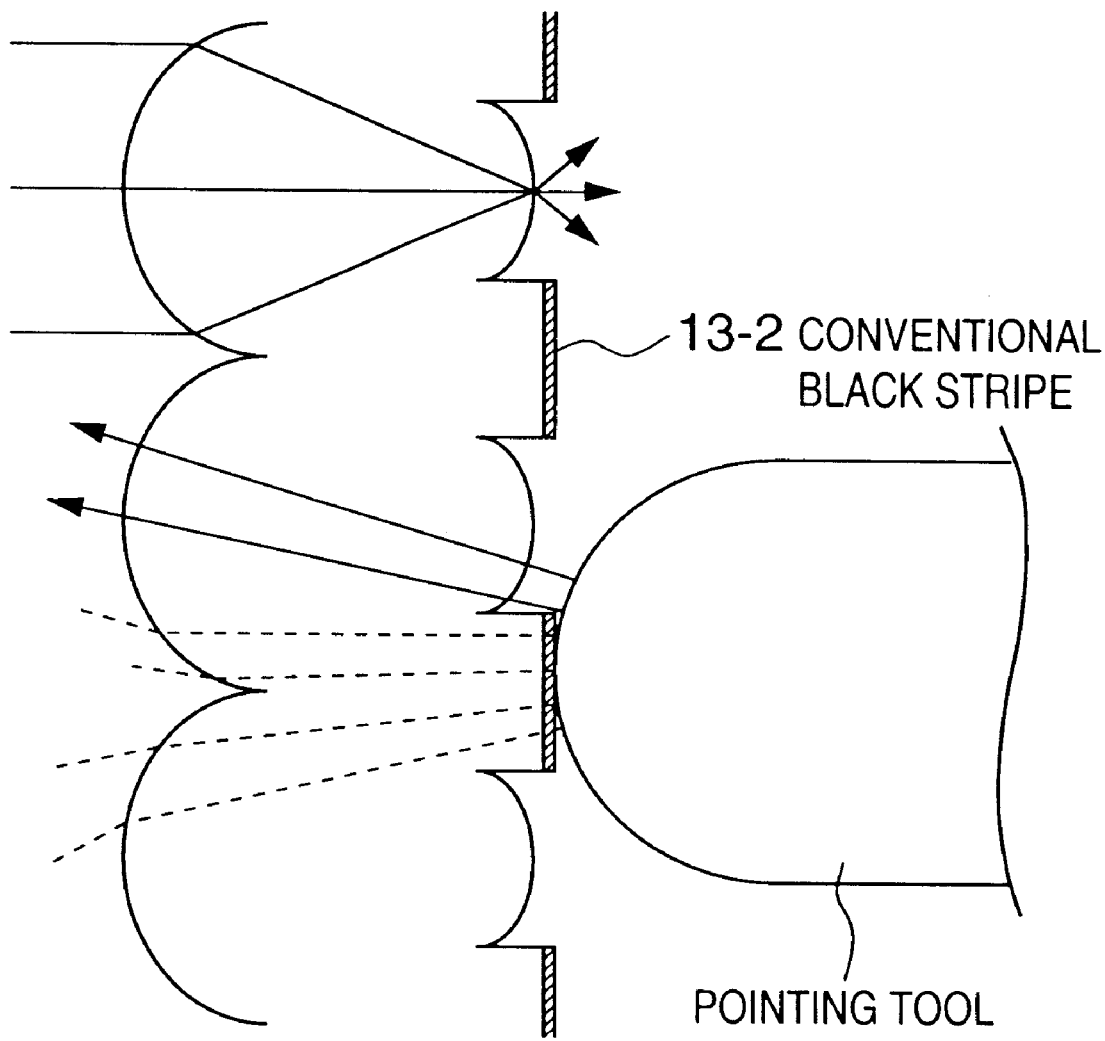
FIG. 22 is a view showing an arrangement of a conventional screen.

As shown in the horizontal sectional view in FIG. 21, the screen 10 may be constructed by the lenticular plate 10-2 in which the black stripes absorb light components in the visible light range except the image light beam transmission portion regardless of the positions, and the transmittance for infrared light from the pointing tool becomes high from the screen central portion to the peripheral portion. In the conventional arrangement, the light amount detected by the coordinate detector 1 becomes small from the central portion to the peripheral portion of the screen 10 because of an optical characteristic representing that at the peripheral portion, the distance to the coordinate detector 1 is large, and the light obliquely becomes incident on the screen. Hence, unless the electrical dynamic range of the coordinate detector 1 is wide, the coordinates cannot be sufficiently accurately detected.

In the screen arrangement shown in FIG. 21, the amount of infrared light transmitted through the screen toward the coordinate detector 1 is uniformed regardless of the position. Hence, even when the electrical dynamic range of the coordinate detector 1 is narrow, the coordinates can be highly accurately detected without any influence of a change in light amount depending on the position.

In the embodiment shown in FIG. 21, the transmittance for infrared light in the horizontal direction is changed. It is more effective to also vertically increase the transmittance for infrared light from the pointing tool from the screen central portion to the peripheral portion.

As has been described above, according to this embodiment, a high-performance coordinate input apparatus with high resolving power can be provided, which can suppress the influence of disturbance light and ensure a sufficient incident light amount to the sensor while holding a high-contrast image by forming a region having optical characteristics with which reflection of external light in the visible light range from the input surface of the screen 10 is prevented, and infrared light from the pointing tool 4 is transmitted.

The present invention may be applied to a system constituted by a plurality of devices (e.g., a host computer, an interface device, a reader, a printer, and the like) or an apparatus comprising a single device (e.g., a copying machine, a facsimile apparatus, or the like).

As many apparently widely different embodiments of the present invention can be made without departing from the spirit and scope thereof, it is to be understood that the invention is not limited to the specific embodiments thereof except as defined in the appended claims.

What is claimed is:

1. A coordinate input apparatus for irradiating a predetermined position on a coordinate input screen with light from a pointing tool to generate a light spot and generating coordinates corresponding to the light spot, comprising:

projection means for projecting an image onto the coordinate input screen; and prevention means, having a region with optical characteristics for transmitting light from the pointing tool, for preventing reflection of external light in a visible light range from an input surface of the coordinate input screen.

2. The apparatus according to claim 1, wherein the coordinate input screen has a Fresnel plate formed from Fresnel lenses and a lenticular plate formed from lenticular lenses having a diffusion function in a horizontal direction, and the region having the optical characteristics is formed outside an exit region of image projection light related to the lenticular plate.

3. The apparatus according to claim 1, wherein the region having the optical characteristics is formed by one of a coating and dye having a transmission characteristic only in an infrared light wavelength range.

4. The apparatus according to claim 1, wherein the region having the optical characteristics is formed by one of a filter and film having a transmission characteristic only in an infrared light wavelength range.

5. The apparatus according to claim 4, wherein the filter or film has a curved surface in a transmission direction of light from the pointing tool.

6. The apparatus according to claim 1, wherein a surface of the region having the optical characteristics is matted.

7. The apparatus according to claim 1, wherein the region having the optical characteristics is formed outside an exit region of image projection light related to a front plate arranged in front of the lenticular plate.

8. The apparatus according to claim 1, wherein the region having the optical characteristics is formed in an entire region of a front plate arranged in front of the lenticular plate.

9. The apparatus according to claim 1, wherein in the region having the optical characteristics, a transmittance for the light from the pointing tool increases from a central portion of the coordinate input screen to a peripheral portion.

\* \* \* \* \*

UNITED STATES PATENT AND TRADEMARK OFFICE
CERTIFICATE OF CORRECTION

PATENT NO. : 6,317,266 B1
DATED : November 13, 2001
INVENTOR(S) : Yuichiro Yoshimura et al.

It is certified that error appears in the above-identified patent and that said Letters Patent is hereby corrected as shown below:

<u>Column 12,</u>
Line 4, "shown)," should read -- shown) --.

Signed and Sealed this

Fourth Day of June, 2002

Attest:

JAMES E. ROGAN
Attesting Officer  Director of the United States Patent and Trademark Office